(12) United States Patent
Nakata et al.

(10) Patent No.: US 6,564,310 B2
(45) Date of Patent: *May 13, 2003

(54) DATA TRANSFER CIRCUIT AND A RECORDING APPARATUS AND METHOD USING A PREDETERMINED OFFSET FOR CALCULATING START

(75) Inventors: Kazuhiro Nakata, Inagi (JP); Shinichi Hirasawa, Sagamihara (JP); Tadashi Yamamoto, Yokohama (JP); Toshiharu Inui, Yokohama (JP); Kazuhiro Nakajima, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,263

(22) Filed: Nov. 7, 1997

(65) Prior Publication Data

US 2002/0013890 A1 Jan. 31, 2002

Related U.S. Application Data

(63) Continuation of application No. 08/342,046, filed on Nov. 17, 1994, now abandoned.

(30) Foreign Application Priority Data

Nov. 29, 1993 (JP) ............................... 5-298190
Nov. 29, 1993 (JP) ............................... 5-298196
Dec. 28, 1993 (JP) ............................... 5-335924

(51) Int. Cl.$^7$ ............................... G06F 12/00

(52) U.S. Cl. ............................. 711/202; 711/220; 347/9; 347/211

(58) Field of Search ................................. 711/202, 220; 347/40, 200, 9; 400/120.2; 395/800.05; 712/5; 710/52

(56) References Cited

U.S. PATENT DOCUMENTS

| 4,313,124 A | 1/1982 | Hara .................... 346/140 R |
| 4,345,262 A | 8/1982 | Shirato et al. .......... 346/140 R |
| 4,459,600 A | 7/1984 | Sato et al. ............. 346/140 R |
| 4,463,359 A | 7/1984 | Ayata et al. ............. 346/1.1 |
| 4,543,660 A * | 9/1985 | Maeda .................... 382/218 |
| 4,558,333 A | 12/1985 | Sugitani et al. ......... 346/140 R |

(List continued on next page.)

FOREIGN PATENT DOCUMENTS

| EP | 0469854 | 2/1992 |
| JP | 54-56847 | 5/1979 |
| JP | 58-179655 | 10/1983 |
| JP | 58-203084 | 11/1983 |
| JP | 59 123670 | 7/1984 |
| JP | 59 138461 | 8/1984 |
| JP | 60-71260 | 4/1985 |

(List continued on next page.)

Primary Examiner—Richard L. Ellis
Assistant Examiner—Gautam R. Patel
(74) Attorney, Agent, or Firm—Fitzpatrick, Cella, Harper & Scinto

(57) ABSTRACT

A data transfer circuit or a recording apparatus includes an address setting unit for setting a start address for a buffer memory, an offset setting unit for setting an offset for the buffer memory, and an address creating unit for creating a predetermined number of consecutive transfer addresses to be supplied for the buffer memory using a reference address. The circuit also includes an arithmetic logic unit that, after the address creating unit has created transfer addresses using the start address as a reference address, calculates a new reference address in accordance with the offset relative to the start address so as to provide the new reference address to the address creating unit.

8 Claims, 25 Drawing Sheets

U.S. PATENT DOCUMENTS

| | | | | |
|---|---|---|---|---|
| 4,608,577 A | | 8/1986 | Hori | 346/140 R |
| 4,703,449 A | * | 10/1987 | Berman | 395/872 |
| 4,709,248 A | | 11/1987 | Piatt et al. | 346/140 R |
| 4,723,129 A | | 2/1988 | Endo et al. | 346/1.1 |
| 4,740,796 A | | 4/1988 | Endo et al. | 346/1.1 |
| 4,942,390 A | * | 7/1990 | Do et al. | 395/114 |
| 5,199,101 A | | 3/1993 | Cusick et al. | 395/115 |
| 5,450,099 A | * | 9/1995 | Stephenson et al. | 347/200 |
| 5,465,374 A | * | 11/1995 | Dinkjian et al. | 395/800 |
| 5,478,157 A | * | 12/1995 | Kohno et al. | 400/120.02 |
| 5,563,987 A | * | 10/1996 | Scott | 395/115 |

FOREIGN PATENT DOCUMENTS

| | | |
|---|---|---|
| JP | 61-106290 | 5/1986 |
| JP | 01-113257 | 5/1989 |
| JP | 1-208143 | 8/1989 |
| JP | 3-208656 | 9/1991 |
| JP | 03-246042 | 11/1991 |
| JP | 04-082758 | 3/1992 |
| JP | 4-338881 | 11/1992 |
| JP | 5-077488 | 3/1993 |

* cited by examiner

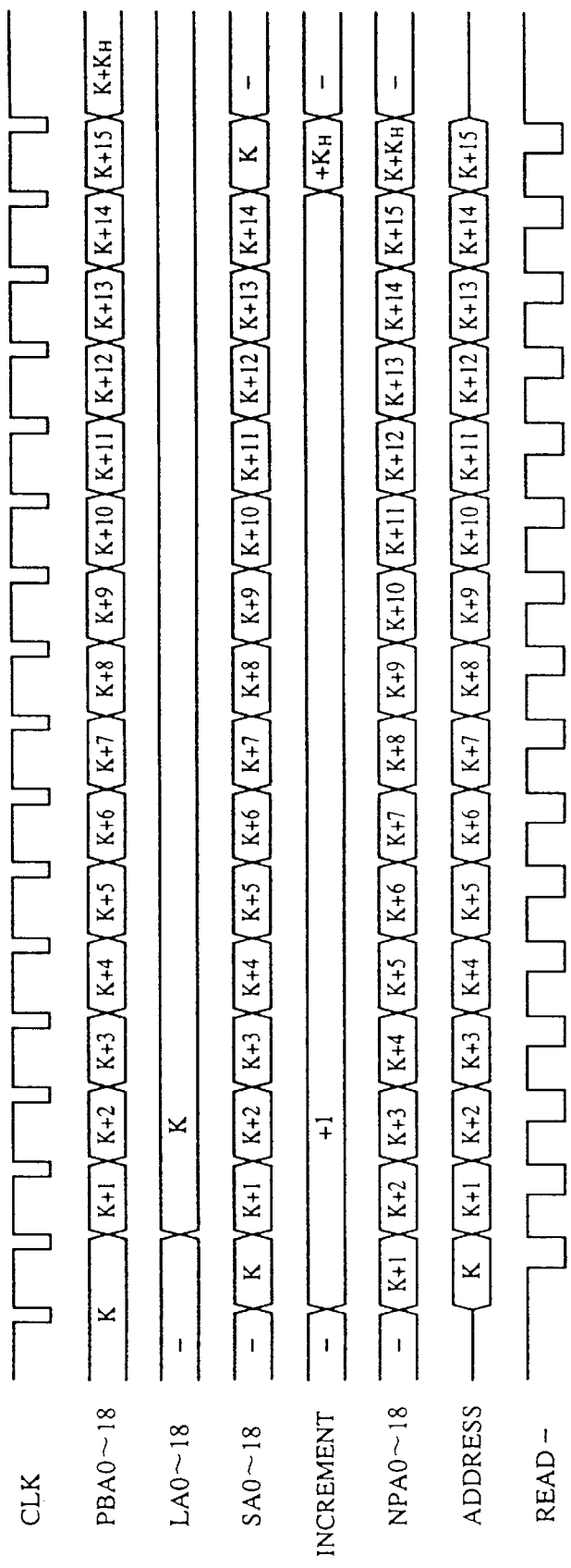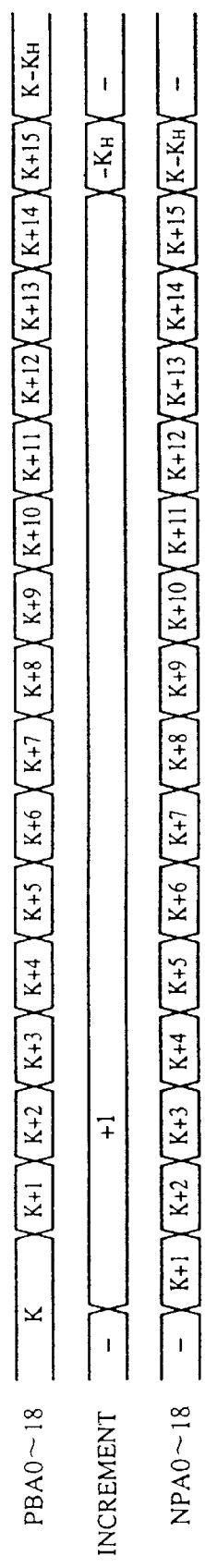
FIG. 4

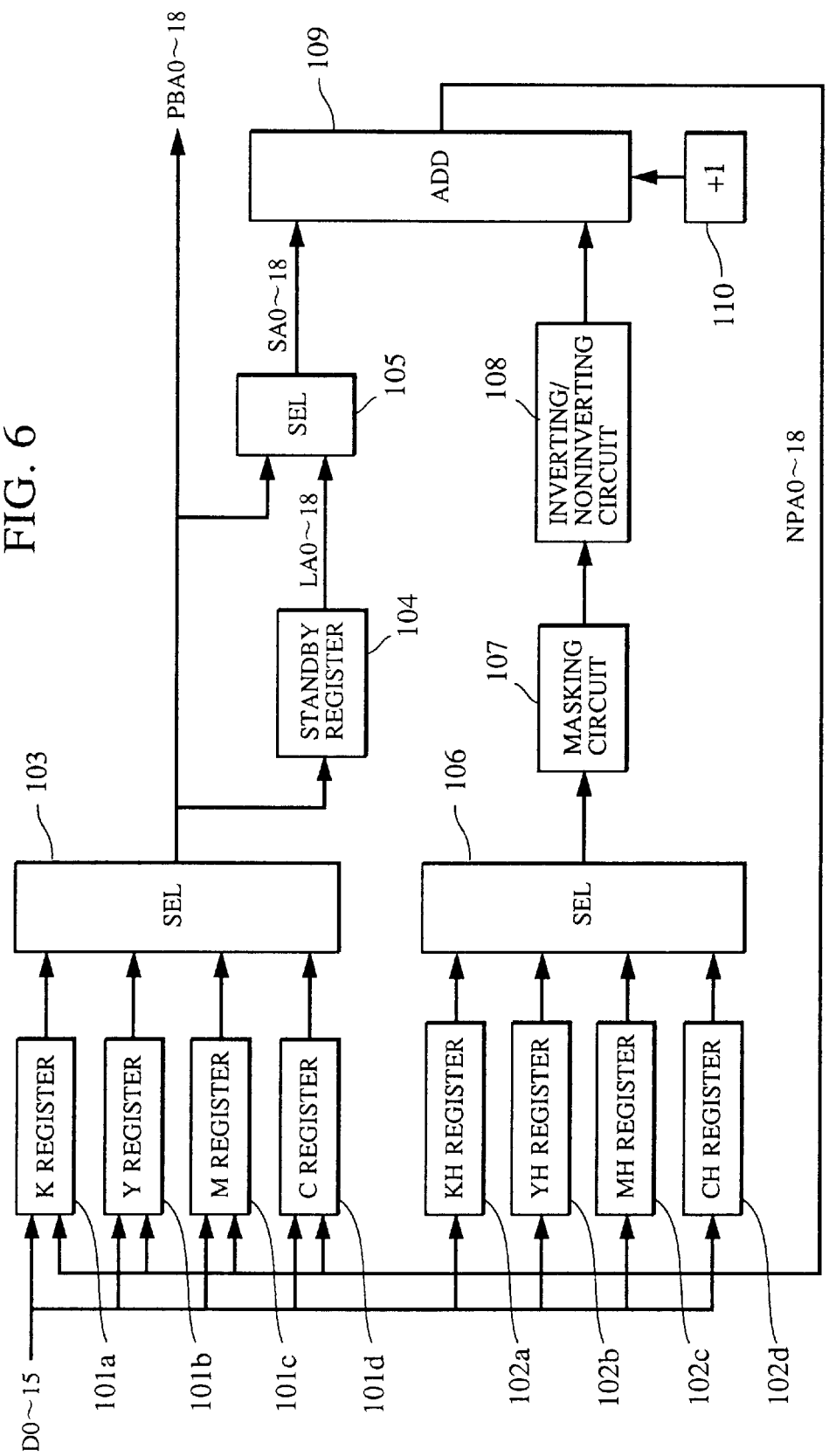

FIG. 9
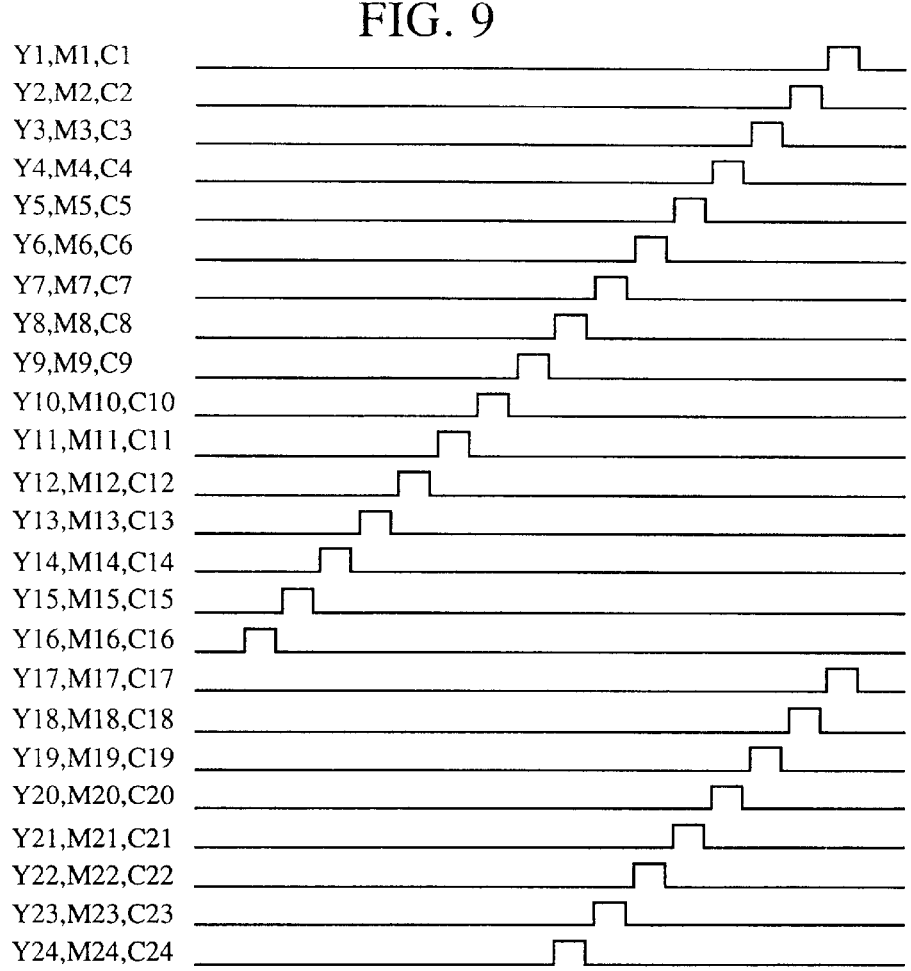
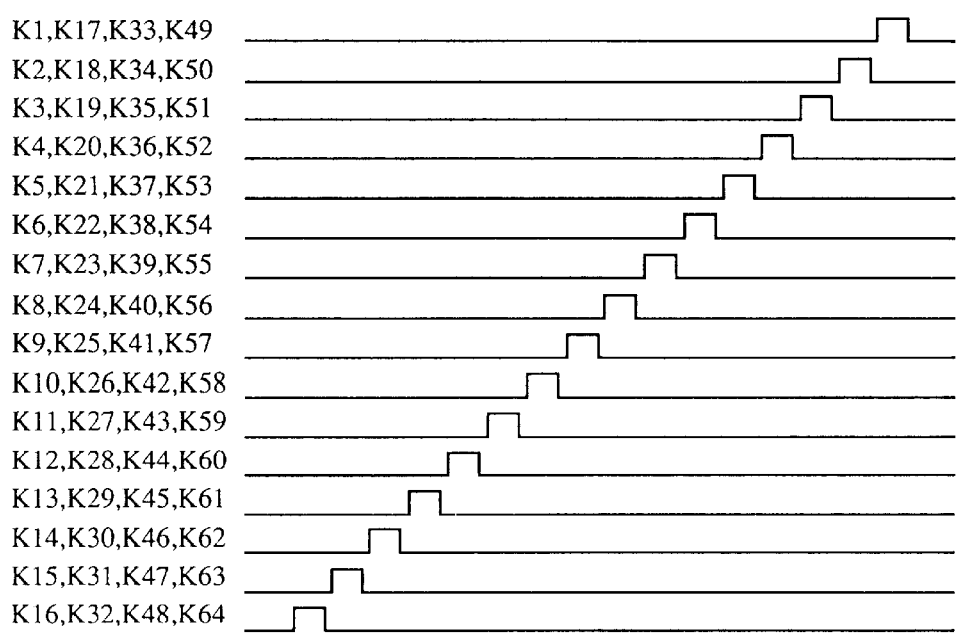

FIG. 10A
FIG. 10B
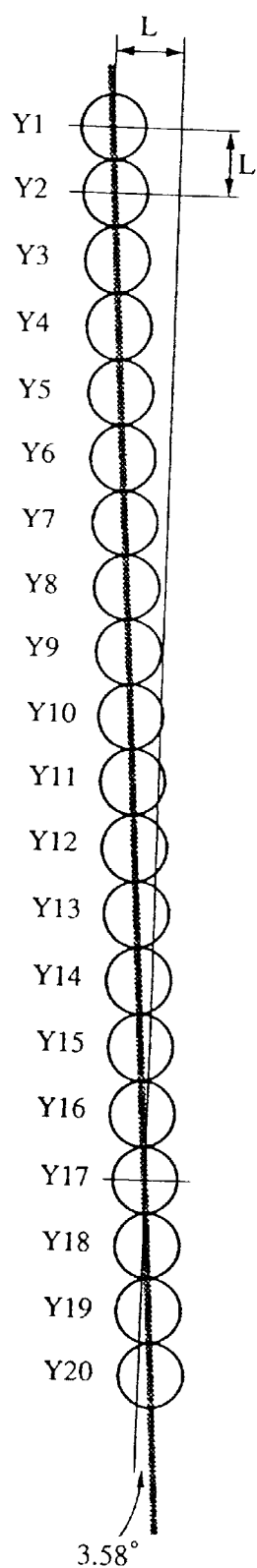
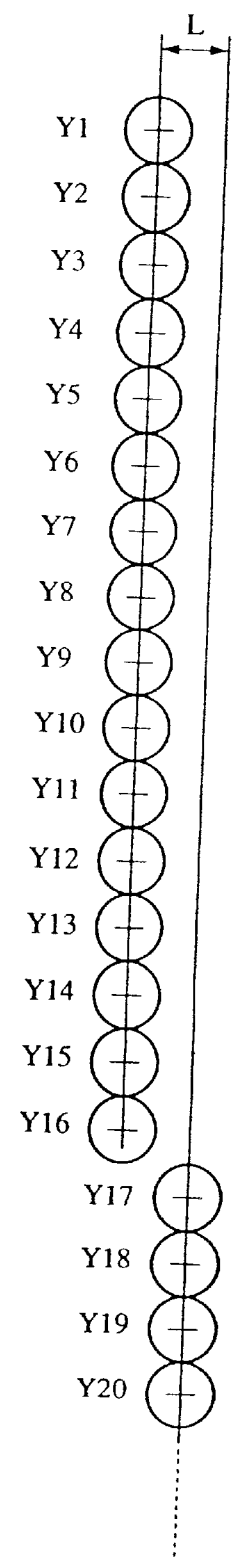
3.58°

DATA TRANSFER CIRCUIT AND A RECORDING APPARATUS AND METHOD USING A PREDETERMINED OFFSET FOR CALCULATING START

This application is a continuation of application Ser. No. 08/342,046 filed Nov. 17, 1994, now abandoned.

BACKGROUND OF THE INVENTION

1. Field of the Invention

The present invention relates to a data transfer circuit, and to a recording apparatus and method. More particularly, this invention is concerned with a data transfer circuit for transferring data between a memory and a print head in a serial printer, and with a recording apparatus and method for realizing time-sharing recording.

2. Description of the Related Art

Currently, many serial printers such as ink-jet printers and wire-dot printers are designed to print an image composed of dots on recording paper. For printing, data and commands sent from a host system (a computer) must be analyzed in order to produce print data (which may be referred to as record data) in the form of bit image data provided in one-to-one correspondence with dots constituting an image to be printed. The bit image data is then stored in a print buffer in a memory. While a carriage having a print head (which may be referred to a record or recording head) mounted is being scanned, print data is read from the print buffer. Based on the data, the print head is driven. Thus, the recording paper is printed.

In recent years, there has been a tendency toward adopting a smaller dot pitch (which may be referred to as a pixel pitch) for a printer in an effort to improve image definition. An amount of print data is proportional to a dot density. The amount of print data to be stored in a print buffer therefore increases with higher definition. On the other hand, the frequency used for driving a print head is also increasing. This is intended to increase a printing speed. For reading the print buffer, it is therefore necessary to transfer a large amount of data quickly. Data transfer dependent on software imposes a large load on a processor (MPU). Recently, it has become common to install a data transfer circuit designed exclusively for reading the print buffer in order to implement direct memory access (DMA) and other hardware processing.

However, a conventional data transfer circuit has a relatively simple transfer function alone. Such a data transfer circuit therefore merely reads data sequentially from a print buffer and prints the data. A data structure in the print buffer must be consistent with a dot array formed by a print head. When a print head has a complex structure, for example, when a dot array formed by a print head lies askew with respect to a scan direction, or when a print head such as the one in a color printer has printing elements (which may be referred to as recording elements) differing among respective colors, the data structure in the print buffer is complex and more time is required for production of print data.

With a recent trend toward a higher-speed printer, not only a printing speed of a print head but also a time required for production of print data has come to greatly affect a throughput of a printer. What is now a critical problem is how to reduce the time required for production of print data.

Recording techniques, in which a print head having a plurality of printing elements is used to record on a recording medium are divided into dot-impact recording techniques, thermal recording techniques, and an ink-jet recording techniques. In these techniques, a larger number of printing elements leads to a larger power consumption for instantaneous driving. The techniques therefore require a large-scale power supply unit and a large-capacity power line capable of delivering a large current.

As far as the ink-jet recording technique is concerned, when numerous nozzles (printing elements) are driven simultaneously, shock waves generated by the nozzles interfere with one another in a common liquid chamber incorporated in a print head and used for feeding ink. This results in unstable jetting.

A conventional method often adopted as a means for solving the foregoing problem is that printing elements are divided into a plurality of groups and driven at shared time instants within a drive cycle. This method alleviates the foregoing drawback of the power supply system because the power consumption for driving nozzles is even within the drive cycle. When used in combination with the ink-jet recording technique, this method minimizes interference among shock waves.

However, it is only when a plurality of printing elements are driven simultaneously that ink droplets are recorded at correct dot positions (which may be referred to as pixel locations) on a recording medium. When the printing elements are driven at shared time instants, ink droplets are recorded at pixel locations different from correct ones, as shown in FIG. 17. This results in a disordered image. In the example shown in FIG. 17, the number of groups of printing elements is four. The groups are driven at equally shared time instants. An intersection between dashed lines indicates a correct recording position. Black dots indicate positions at which ink droplets are shot by a print head according to image information. White dots indicate positions at which ink droplets are not shot according to image information and which are invisible on recording paper. In this example, a longitudinal rule is drawn. FIG. 17 reveals that when shared time instants at which groups of printing elements are driven are distributed widely within a drive cycle, a resultant image is prone to terrible disorder.

The shared time instants at which groups of printing elements are driven cannot therefore be distributed widely. FIG. 18 shows an example in which groups of printing elements are driven at equally-shared time instants within a half of a drive cycle. Image disorder is alleviated but still exists, and the aforesaid effect of suppressing interference among shock waves in a common liquid chamber is halved.

SUMMARY OF THE INVENTION

An object of the present invention is to provide a data transfer circuit that minimizes a load imposed on a CPU and depends very little on a data structure in a buffer.

Another object of the present invention is to provide a recording apparatus and method in which shared time instants at which groups of printing elements are driven are distributed widely within a drive cycle in order to further alleviate the drawback of a power supply system and to further reduce the interference among shock waves associated with an ink-jet recording technique, and in which even when the groups of printing elements are driven at shared time instants, image disorder does not occur.

In order to achieve the foregoing objects, the present invention is characterized by a data transfer circuit, comprising:

an address setting circuit for setting a start address for a buffer memory;

offset setting means for setting an offset for the buffer memory;

address creating means for creating a predetermined number of consecutive transfer addresses to be supplied for reading from the buffer memory using a reference address; and arithmetic logic means for, after said address creating means has created transfer addresses using said start address as a reference address, calculating a new reference address in accordance with said offset relative to said start address so as to provide said new reference address to said address creating means for creating further transfer addresses.

In order to achieve the foregoing objects, the present invention is characterized by a data transfer circuit, comprising:

address setting means for setting a plurality of start addresses for a buffer memory address selecting means for selecting said plurality of start addresses sequentially;

offset setting means for setting a plurality of offsets for the buffer memory, each said offset being associated with one of said start addresses;

offset selecting means for selecting offsets associated with the start addresses selected by said address selecting means;

address creating means for creating a predetermined number of consecutive transfer addresses to be supplied for reading from the buffer memory using reference addresses; and arithmetic logic means for, after said address creating means created transfer addresses using said start addresses as reference addresses, calculating new reference addresses in accordance with said selected offsets relative to said associated selected start addresses so as to provide said new reference addresses to said address creating means for creating further transfer addresses.

In order to achieve the foregoing objects, the present invention is characterized by a data transfer circuit, comprising:

address setting means for setting a start address for a buffer memory;

offset setting means for setting an offset for the buffer memory;

address creating means for creating a transfer address to be supplied for reading from the buffer memory using a reference address, said address creating means including means for incrementing said transfer address and means for adding said offset to said transfer address to be incremented; and arithmetic logic means for, after said address creating means has created said transfer address using said start address as a reference address, calculating a new reference address in accordance with said offset relative to said start address so as to provide the new reference address to said address creating means.

In order to achieve the foregoing objects, the present invention is characterized by a data transfer circuit, comprising:

first and second address creating means, each including means for setting a start address for a respective buffer memory, means for setting an offset for the buffer memory, means for creating a predetermined number of consecutive transfer addresses to be supplied for reading from the buffer memory using as a reference address, and means for, after said address creating means has created transfer addresses using said start address as a reference address, calculating a new reference address in accordance with said offset relative to said start address so as to provide said new reference address to said address creating means; and means for selecting a first transfer address created by said first address creating means or a second transfer address created by said second address creating means.

In order to achieve the foregoing objects, the present invention is characterized by a recording apparatus for recording a recording medium using a print head, comprising:

a buffer memory for storing print data;

address setting means for setting a start address for said buffer memory;

offset setting means for setting an offset for said buffer memory;

address creating means for creating a predetermined number of consecutive transfer addresses to be supplied for reading from said buffer memory using a reference address; and arithmetic logic means for, using said start address as an reference address, calculating a new reference address in accordance with said offset relative to said start address so as to provide said new reference address to said address creating means for creating further transfer addresses.

In order to achieve the foregoing objects, the present invention is characterized by a recording apparatus for recording a recording medium using a plurality of print heads, comprising:

a buffer memory for storing print data;

address setting means for setting a plurality of start addresses for said buffer memory address selecting means for selecting said plurality of start addresses sequentially;

offset setting means for setting a plurality of offsets for said buffer memory, each said offset being associated with one of said start addresses;

offset selecting means for selecting offsets associated with the selected start addresses selected by said address selecting means;

address creating means for creating a predetermined number of consecutive transfer addresses to be supplied for reading from said buffer memory using reference addresses; and arithmetic logic for, that after said address creating means has created transfer addresses using said start addresses as reference addresses, calculating new reference addresses in accordance with said selected offsets relative to said associated selected start addresses so as to provide said new reference addresses for said address creating means.

In order to achieve the foregoing objects, the present invention is characterized by a recording apparatus for recording a recording medium using a print head, comprising:

a buffer memory for storing print data;

address setting means for setting a start address for said buffer memory;

offset setting means for setting an offset for said buffer memory;

address creating means for creating a transfer address to be supplied for reading from said buffer memory using a reference address, said address creating means including means for incrementing said transfer address and means for adding said offset to said transfer address to be incremented; and arithmetic logic means for, after said address creating means has created said transfer address using said start address as a reference address, calculating a new reference address in accordance with said offset relative to said start address so as to provide the new reference address to said address creating means.

In order to achieve the foregoing objects, the present invention is characterized by a recording apparatus for recording a recording medium using a print head, comprising:

buffer memories for storing print data;

first and second address creating means each including means for setting a start address for a respective buffer memory, means for setting an offset for said buffer memory, means for creating a predetermined number of consecutive transfer addresses to be supplied for reading from said buffer memory using a reference address, and means for, after said address creating means has created said transfer addresses, using said start address as a reference address, calculating a new reference address in accordance with said offset relative to said start address so as to provide said new reference address to said address creating means; and means for selecting a first transfer address created by said first address creating means or a second transfer address created by said second address creating means.

In order to achieve the foregoing objects, the present invention is characterized by a recording apparatus for recording a recording medium, comprising:

a print head having a plurality of print elements set in array, said print elements being divided into M groups in units of a predetermined distance and driven at M shared time instants according to image information;

scanning means for scanning said print head at a scanning speed relative to the recording medium; and driving means for driving said M groups at M equally-shared time instants within a drive cycle of said print head, wherein, assuming that an angle of a first direction, in which said print elements are arrayed, with respect to a second direction, in which said print head is scanned relative to said recording medium, is θ, that a dot pitch in a third direction, perpendicular to said second direction is a, and that a dot pitch in said second direction is b, the following relationship is established:

$$\tan \theta = (P \times b)/(M \times a),$$

where P is an integer that is equal to or larger than 1 and smaller than M.

In order to achieve the foregoing objects, the present invention is characterized by a recording method for recording a recording medium, comprising the steps of:

preparing a print head having a plurality of printing elements set in array, the printing elements being divided into M groups in units of a predetermined distance and driven at M shared time instants according to image information;

scanning the print head at a scanning speed relative to the said recording medium; and driving the M groups at M equally shared time instants within a drive cycle of the print head, wherein, assuming that an angle of a first direction, in which the print elements are arrayed, with respect to a second direction, in which the print head is scanned relative to the recording medium is θ, that a dot pitch in a third direction, perpendicular to said second direction, is a, and that a dot pitch in said second direction is b, the following relationship is established:

$$\tan \theta = (P \times b)/(M \times a),$$

where P is an integer that is equal to or larger than 1 and smaller than M.

In order to achieve the foregoing objects, the present invention is characterized by a recorded matter manufactured according to a recording method for recording a recording medium, said recording method comprising the steps of:

preparing a print head having a plurality of printing elements set in array, the printing elements being divided into M groups in units of a predetermined distance and driven at M shared time instants according to image information;

scanning the print head at a scanning speed relative to the said recording medium; and driving the M groups at M equally shared time instants within a drive cycle of the print head, wherein, assuming that an angle of a first direction, in which the print elements are arrayed, with respect to a second direction, in which the print head is scanned relative to the recording medium is θ, that a dot pitch in a third direction, perpendicular to said second direction, is a, and that a dot pitch in said second direction is b, the following relationship is established:

$$\tan \theta = (P \times b)/(M \times a),$$

where P is an integer that is equal to or larger than 1 and smaller than M.

According to the foregoing configuration, a data transfer circuit for transferring data, for example, from a print buffer to a print head, is provided with the function of reading the print buffer in line with the structure of a print head and a printing technique. A data structure in the print buffer can therefore be optimized for a processor irrespective of the structure of the print head. The time required for producing print data can therefore be reduced, thus improving throughput of the printer.

According to the aforesaid configurations, an angle θ and a time lag in driving a group of printing elements are canceled out. Consequently, displaced printing is resolved.

BRIEF DESCRIPTION OF THE DRAWINGS

FIG. 4 is a timing chart describing actions taken by the address creating circuit in the first embodiment;

FIG. 6 is a block diagram showing an address creating circuit in the second embodiment;

FIGS. 7A to 7D show a data structure in a print buffer in the second embodiment;

FIG. 9 is a timing chart describing a driving sequence for a print head in the third embodiment;

FIGS. 10A and 10B detail dot arrays formed by part of the print head in the third embodiment;

DESCRIPTION OF THE PREFERRED EMBODIMENTS

Embodiments of the present invention will be described specifically with reference to the drawings.

(First Embodiment)

Figure 1:
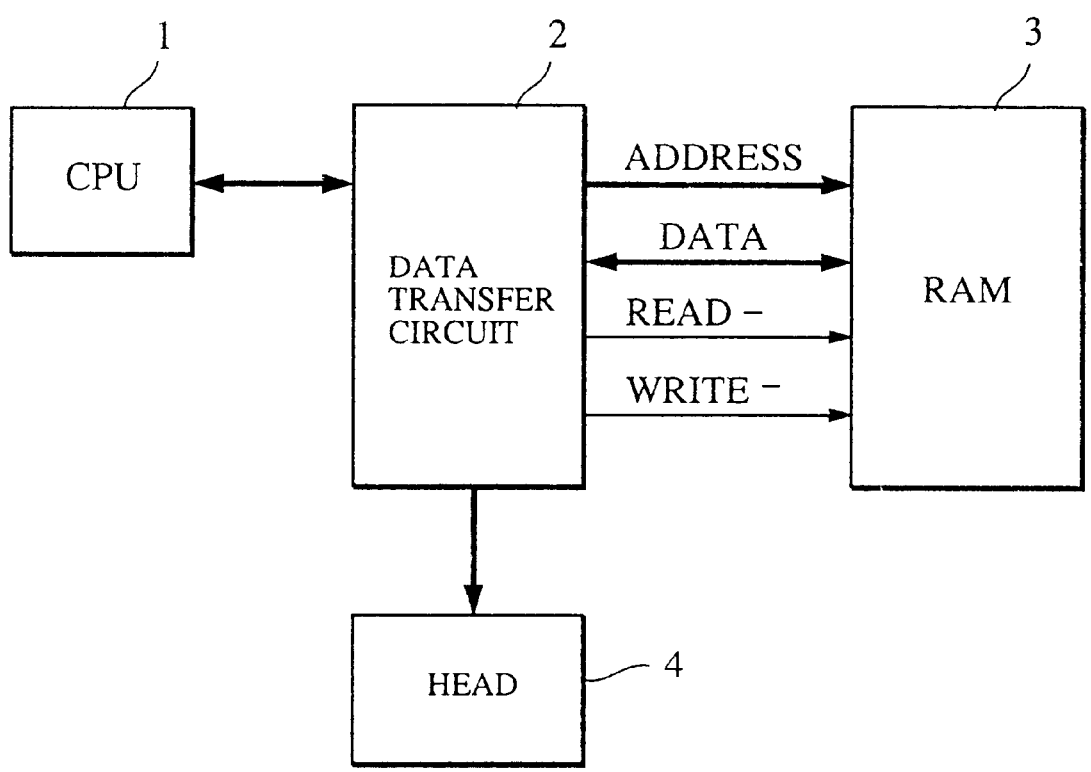
FIG. 1 is a block diagram showing a major portions of circuitry of a printer of the first embodiment.

FIG. 1 is a block diagram showing circuitry in accordance with the present invention. In FIG. 1, reference numeral 1 denotes a CPU. 2 denotes a data transfer circuit. 3 denotes a RAM. 4 denotes a print head.

The CPU 1 produces print data and stores it in a print buffer in the RAM 3. Data transfer between the CPU 1 and RAM 3 is effected through the data transfer circuit 2. Print data stored in the print buffer is read by the data transfer circuit 2 and transferred to the print head 4. Data transfer between the data transfer circuit 2 and RAM 3 is controlled according to an address signal ADDRESS, a data signal DATA, a read signal READ-, and a write signal WRITE-. Note that a signal bearing a minus sign – is low active (negative logic).

The data transfer circuit 2 reads data from the print buffer in bytes, converts the data into serial data, and transfers the serial data to the head 4. The head 4 is an ink-jet head in which 128 ink-jet nozzles are set in array. A 128-bit shift register is incorporated in the head 4. Serial data transferred from the data transfer circuit 2 are sequentially stored in the shift register. Based on the data, it is determined whether or not the nozzles should be driven. During one drive cycle of the head, up to 128 dots (for example, black dots) that are lined up in tandem are formed on recording paper. In this printer, the print head that is mounted in a carriage is scanned horizontally relative to recording paper. The recording paper is transported vertically.

Figure 2:
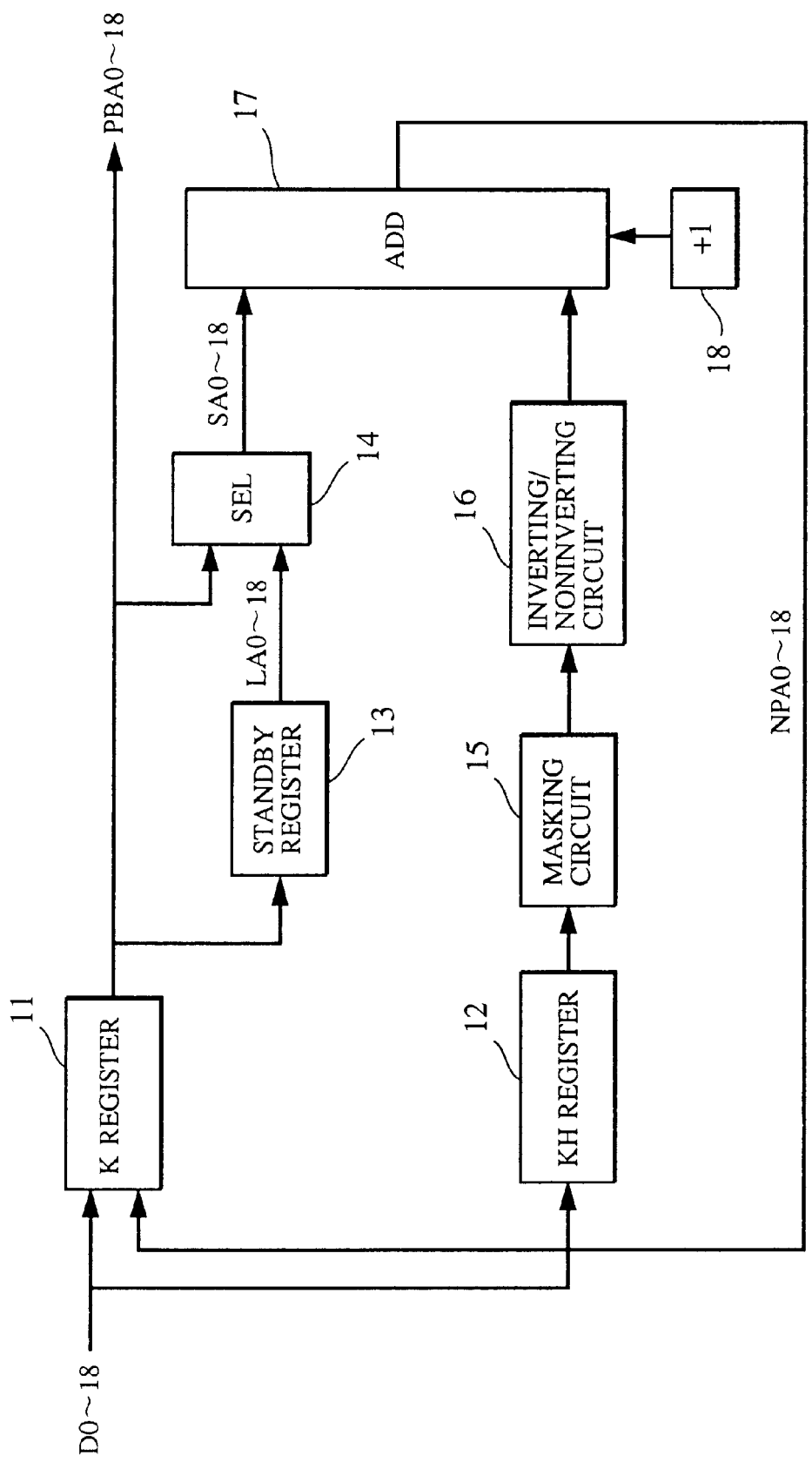
FIG. 2 is a block diagram showing an address creating circuit in the first embodiment.

FIG. 2 is a block diagram showing an address creating circuit included in the data transfer circuit 2 and used for reading the print buffer.

In FIG. 2, reference numeral 11 denotes a black address (K) register. 12 denotes a black horizontal offset (KH) register. 13 denotes a standby register. 14 denotes a selector. 15 denotes a masking circuit. 16 denotes an inverting/noninverting circuit. 17 denotes an adder. 18 denotes a carry control circuit. Data signal lines D0 to D15 deliver data written by the CPU 1. The address register 11 and horizontal offset register 12 are connected to the data signal lines D0 to D15. The address register 11 stores a value as a start address. The horizontal offset register 12 stores a value as a horizontal offset. The CPU 1 manages setting of values as a start address and an offset address respectively. Black (K) is adopted as a print color. Alternatively, cyan (C), magenta (M), or yellow (Y) will do.

Output signals PBA0 to PBA18 of the address register 11 are placed on an address signal line ADDRESS leading to the RAM 3. The standby register 13 temporarily stores a value provided by the address register 11 and supplies the value for signals LA0 to LA18. The selector 14 selects either the signals PBA0 to PBA18 or the signals LA0 to LA18, and supplies a value represented by the selected signals for signals SA0 to SA18. The masking circuit 15 controls masking of a value provided by the horizontal offset register 12. When placed in a masking mode, the masking circuit 15 outputs a value 0. When placed in a non-masking mode, the masking circuit 15 outputs a value provided by the horizontal offset register 12 as it is.

The inverting/noninverting circuit 16 controls inverting/noninverting of a value provided by the masking circuit 15. The adder 17 adds up a value provided by the selector 14 and a value provided by the inverting/noninverting circuit 16, and supplies the sum for signals NPA0 and NAP18. The carry control circuit 18 controls a carry input signal of the adder 17. The signals NPA0 to NPA18 are fed to the address register 11 and used for re-setting an address value.

Figure 3:
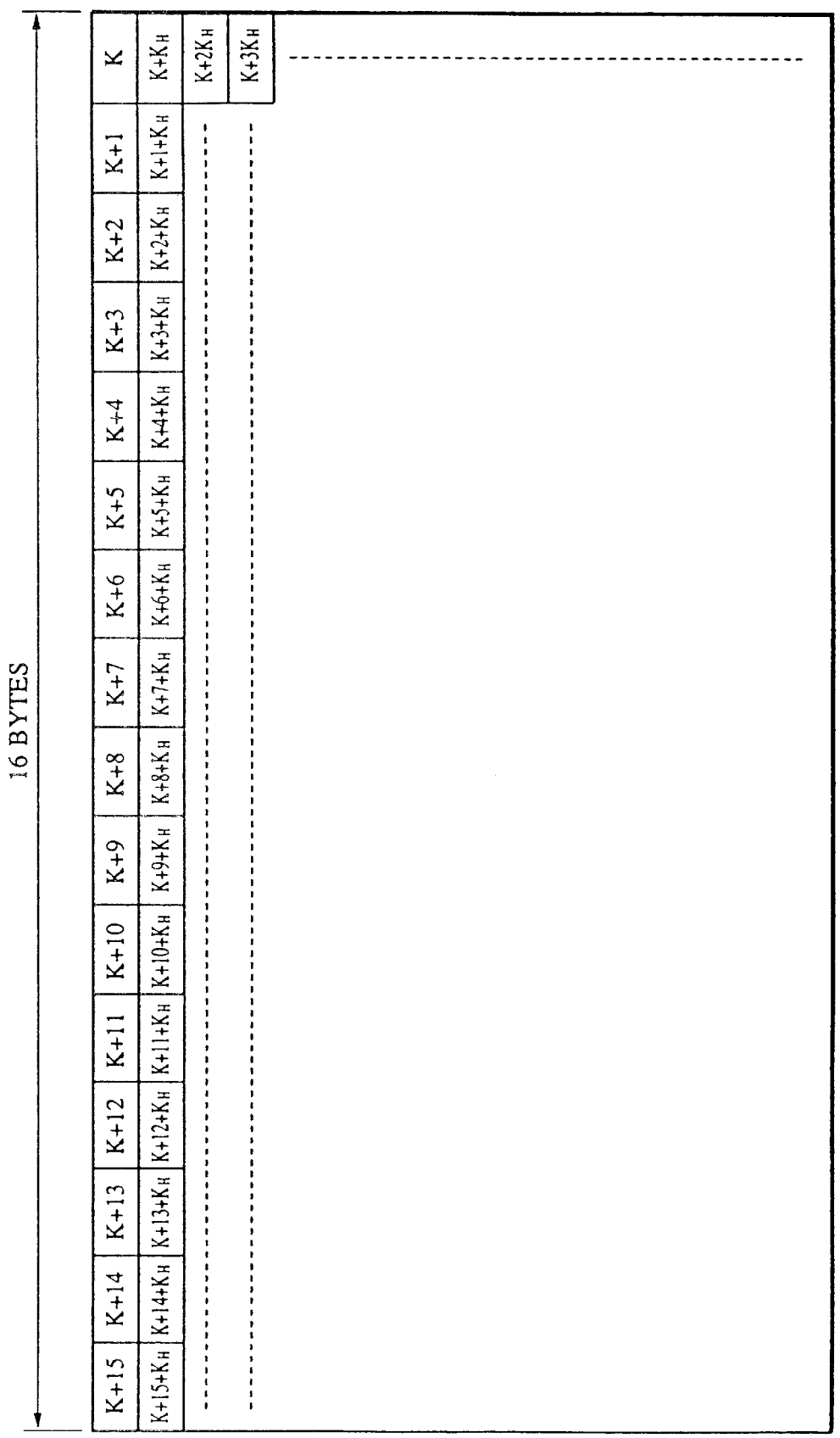
FIG. 3 shows a data structure in a print buffer in the first embodiment.

FIG. 3 shows a data structure in a print buffer. In FIG. 3, each rectangle indicates one byte of print data. An expression in each rectangle indicates an address at which print data is stored. K in an expression represents a start address. KH represents a horizontal offset. Sixteen-byte data from an address K to an address K+15 is print data for 128 vertically continuous dots. The sixteen-byte data is printed during one drive cycle of the print head. As far as the horizontal direction in the print buffer is concerned, addresses of print data are changed dot by dot in units of a value KH.

FIG. 4 is a timing chart describing actions taken by the data transfer circuit 2. The actions taken by the address creating circuit shown in FIG. 2 will be described specifically in conjunction with FIG. 4.

Described first are the actions taken when forward printing is performed; that is, a carriage is scanned from left to right relative to recording paper. In FIG. 4, CLK denotes a clock for use in attaining synchronism in the address creating circuit. Circuit elements of the address creating circuit change states synchronously with a leading edge of the clock CLK. A value K is pre-set in the address register 11 and a value KH is pre-set in the horizontal offset register 12.

When the data transfer circuit 2 starts reading the print buffer, the value K represented by the signals PBA0 to PBA18 is placed on the address signal line ADDRESS leading to the RAM 3. A read pulse is placed on the read signal line READ-. Print data is therefore read from the start address K and transferred to the print head 4. During the initial reading, the value of the start address, K, is stored in the standby register 13. The signals LA0 to LA18 represent the value K.

The selector 14 has selected the signals PBA0 to PBA18. The signals SA0 to SA18 represent the same value as the signals PBA0 to PBA18. The masking circuit 15 enters a masking mode and outputs a value 0. The inverting/noninverting circuit 16 enters an noninverting mode and outputs the value 0 provided by the masking circuit 15 as it is. The carry control circuit 18 sets a carry flag, whereby a value in the adder 14 is incremented by one.

In FIG. 4, a signal by the name of "increment" represents an increment calculated by adding up a value provided by the inverting/noninverting circuit 16 and a value provided by the carry control circuit 18. A sum of the value represented by the signals SA0 to SA18 and the increment is supplied for the signals NPA0 to NPA18. Since the increment is +1, the signals NPA0 to NPA18 represent a value K+1. The value K+1 is fed back to the address register 11. The value residing in the address register 11 is therefore updated to be K+1 synchronously with the next clock pulse. Print data is then read from the address K+1 and transferred to the print head 4.

Likewise, the value in the address register 11 is incremented until it becomes K+15. The print buffer is therefore read from an address K to K+15 continuously. Print data 16 bytes long is therefore transferred to the print head.

Synchronously with the last clock pulse, the selector 14 selects the signals LA0 to LA18. The signals SA0 to SA18 represent the value K residing in the standby register 13. The masking circuit 15 enters a non-masking mode and outputs the value KH residing in the horizontal offset register 12. The carry control circuit 18 resets the carry flag, whereby the increment is set to the value KH. The signals NPA0 to NPA18 therefore represent a value K+KH. The value K+KH is set in the address register 11 synchronously with the last clock pulse.

As shown in FIG. 3, the address K+KH points to print data residing on the right hand of the address K. After print data for one drive cycle has been transferred to the print head, a value of a right-hand address is automatically re-set in the address register 11. The CPU should merely set a value as a start address before the carriage is scanned but need not re-set another value while the carriage is being scanned.

Next, reverse printing will be described. During reverse printing, similarly to during forward printing, the print buffer is read continuously from an address K to K+15. Print data 16 bytes long is transferred to the print head. However, the inverting/noninverting circuit 16 enters an inverting mode synchronously with the last clock pulse. The carry control circuit 18 sets the carry flag, whereby the increment is set to a value -KH. After print data has been transferred, a value K-KH is set in the address register 11. The value K-KH indicates an address on the left hand of the address K.

Selection performed by the selector 14, masking performed by the masking circuit 15, and inversion performed by the inverting/noninverting circuit 16 are controlled by a timing control circuit, which is not shown, synchronously with the clock CLK.

As mentioned above, the data transfer circuit of this embodiment automatically reads data from the print buffer. The CPU 1 merely sets a value as a start address before the carriage is scanned but need not be involved in reading of the print buffer while the carriage is being scanned. This means that the load imposed on the CPU 1 has been reduced.

A horizontal change of addresses in the print buffer is specified in the horizontal offset register. The number of vertically consecutive addresses can therefore be determined arbitrarily. For example, if the CPU 1 reserves a print buffer 32 bytes high, then print data 16 bytes long residing lengthwise in the print buffer may be used for printing. The CPU 1 can determine a data structure for the print buffer irrespective of the number of dots formed by the print head. Thus, a print buffer is reserved easily.

(Second Embodiment)

Next, the second embodiment of the present invention will be described. A major portion of circuitry of a printer having a data transfer circuit of this embodiment is identical to that shown in FIG. 1. The printer comprises the CPU 1, data transfer circuit 2, RAM 3, and print head 4.

Figure 5:
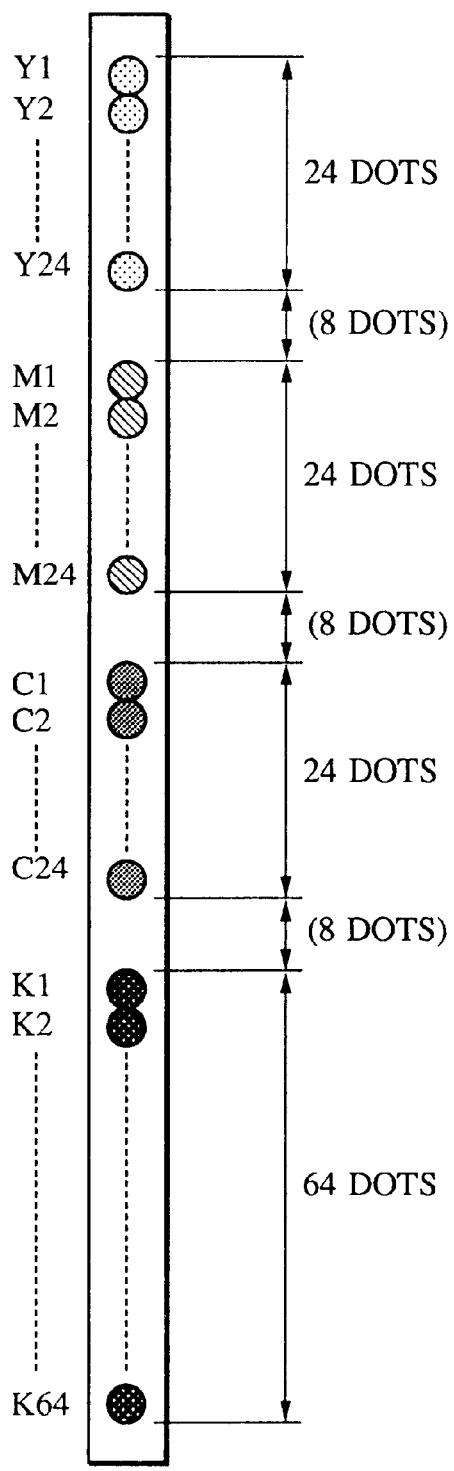
FIG. 5 shows dot arrays formed by a print head in the second embodiment.

FIG. 5 shows dot arrays formed by a print head in this embodiment. The print head is an ink-jet head in which 136 ink-jet nozzles are set in array. The uppermost twenty-four nozzles are loaded with yellow ink and therefore form yellow dots on recording paper. The following twenty-four nozzles form magenta dots, and the lower twenty-four nozzles form cyan dots. The lowermost sixty-four nozzles form black dots. A gap comparable to 8 dots is interposed between two color dot arrays.

The print head has a 136-bit shift register. Data stored in the shift register is checked to see if the nozzles should be driven. In the shift register, 136-bit data is concatenated. For transferring data to the print head, data corresponding to twenty-four yellow dots, twenty-four magenta dots, twenty-dour cyan dots, and sixty-four black dots are lined up in that order and transmitted.

FIG. 6 is a block diagram of an address creating circuit included in the data transfer circuit 2 and used for reading a print buffer. In FIG. 6, reference numeral 101*a* denotes a black address (K) register. 101*b* denotes a yellow address (Y) register. 101*c* denotes a magenta address (M) register. 101*d* denotes a cyan address (C) register. 102*a* denotes a black horizontal offset (KH) register. 102*b* denotes a yellow horizontal offset (YH) register. 102*c* denotes a magenta horizontal offset (MH) register. 102*d* denotes a cyan horizontal offset (CH) register. 103 denotes a selector. 104 denotes a standby register. 105 denotes a selector. 106 denotes a selector. 107 denotes a masking circuit. 108 denotes an inverting/noninverting circuit. 109 denotes an adder. 110 denotes a carry control circuit.

The data signal lines D0 to D15 deliver data written by the CPU 1. The address registers 101*a* to 101*d* and the horizontal offset registers 102*a* to 102*d* are connected to the data signal lines D0 to D15. The address registers 101*a* to 101*d* store values as start addresses in associated color print buffers. The horizontal offset registers 102*a* to 102*d* store values as horizontal offsets in the associated color print buffers. The CPU 1 manages setting of values as start addresses and horizontal offsets. The selector 103 selects any of the values in the address registers 101*a* to 101*d* and supplies it for signals the PBA0 to PBA18. The signals PBA0 to PBA18 are placed on the address signal line ADDRESS leading to the RAM 3 after passing through an output buffer. The standby register 104 temporarily stores the value provided by the selector 103 and supplies it for the signals LA0 to LA18. The selector 105 selects either the signals PBA0 to PBA18 or the signals LA0 to LA18, and supplies the selected signals as the signals SA0 to SA18. The selector 106 selects values provided by the horizontal offset registers 102*a* to 102*d*.

The masking circuit 107 controls masking of a value provided by the selector 106. When placed in the masking mode, the masking circuit 107 outputs a value 0. When placed in the non-masking mode, the masking circuit 107 outputs a value provided by the selector 106 as is. The inverting/noninverting circuit 108 controls inverting or non-inverting of a value provided by the masking circuit 107, The adder 109 adds up a value provided by the selector 105 and a value provided by the inverting/noninverting circuit 108 and supplies the sum for the signals NPA0 to NPA18. The carry control circuit 110 controls the carry input signal of the adder 17. The signals NPA0 to NPA18 are fed to the address registers 101a to 101d and used in re-setting values of addresses.

FIGS. 7A to 7D show a data structure in a print buffer. The print buffer is divided into four fields, shown in FIGS. 7A to 7D, respectively. The fields serve as a yellow print buffer (FIG. 7A), a magenta print buffer (FIG. 7B), a cyan print buffer (FIG. 7C), and a black print buffer (FIG. 7D) in that order from above. A rectangle in each field represents print data one byte long. An expression in each rectangle indicates an address at which print data is stored. Y in an expression represents a start address in the yellow print buffer. YH represents a horizontal offset in the yellow print buffer. M represents a start address in the magenta print buffer. MH represents a horizontal offset in the magenta print buffer. C represents a start address in the cyan print buffer. CH represents a horizontal offset in the cyan print buffer. K represents a start address in the black print buffer. KH represents a horizontal offset in the black print buffer.

Data three bytes long from an address Y to Y+2, data three bytes long from an address M to M+2, data three bytes long from an address C to C+2, and data eight bytes long from an address K to K+7 are print data lined up vertically. The print data is printed during one drive cycle of the print head. As far as the horizontal direction in the yellow print buffer is concerned, addresses of print data are changed dot by dot in units of a value YH. Likewise, in the magenta print buffer, addresses are changed in units of a value MH. In the cyan print buffer, addresses are changed in units of a value CH. In the black print buffer, addresses are changed in units of a value KH.

Figure 8:
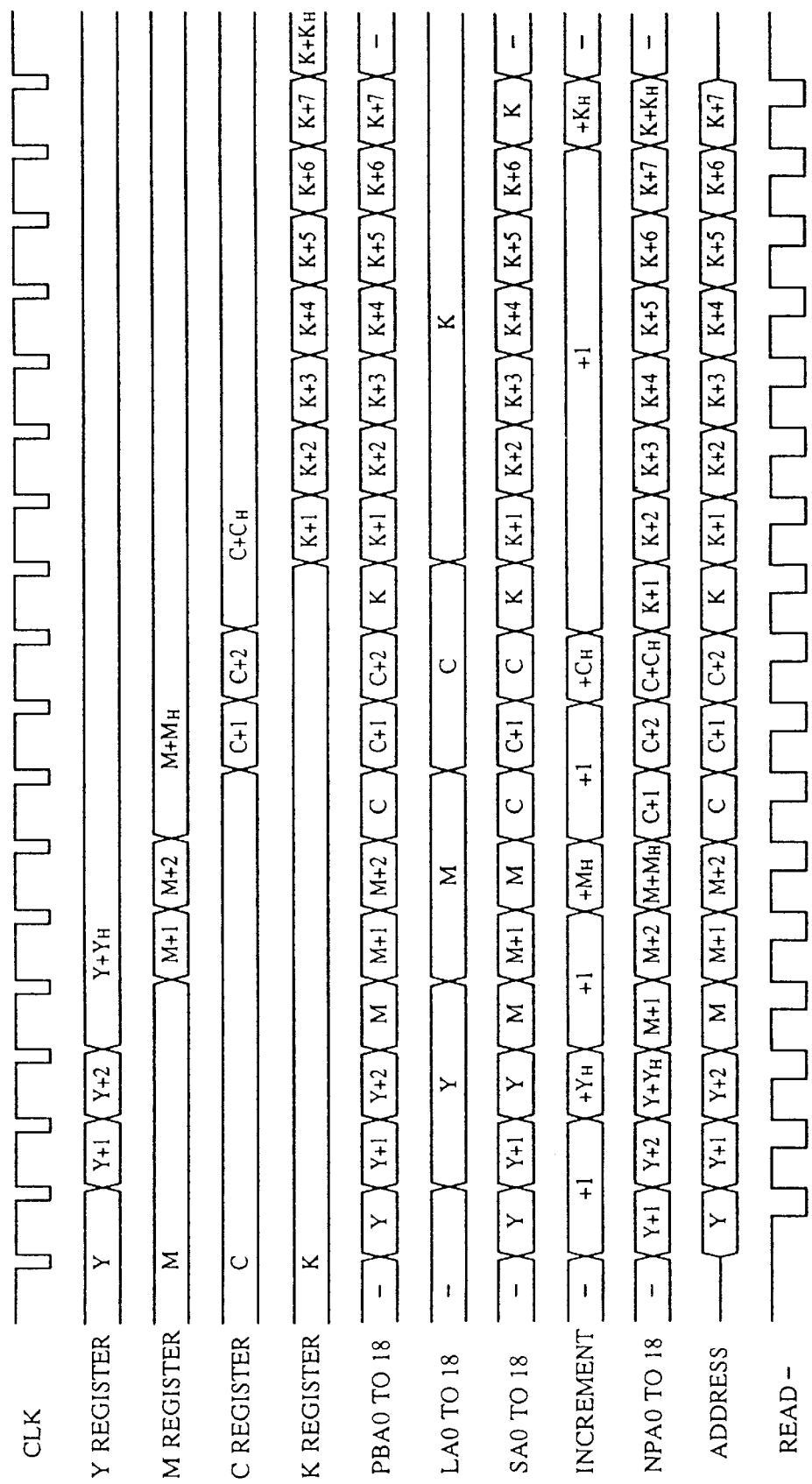
FIG. 8 is a timing chart describing actions taken by the address creating circuit in the second embodiment.

FIG. 8 is a timing chart describing actions taken by the address creating circuit shown in FIG. 6. The timing chart is concerned with forward printing. The actions taken by the address creating circuit shown in FIG. 6 will be described specifically in conjunction with FIG. 8.

In FIG. 8, CLK denotes a clock for attaining synchronism in the address creating circuit. Circuit elements in the address creating circuit change states synchronously with a leading edge of the clock CLK. Values K, Y, M, and C are pre-set in the address registers 101a to 101d. Values KH, YH, and CH are pre-set in the horizontal offset register 12. When the data transfer circuit 2 starts reading the print buffer, the selector 103 first selects the value Y in the address register 101b and supplies it for the signals PBA0 to PBA18. The value represented by the signals PBA0 to PBA18 is placed on the address signal line ADDRESS leading to the RAM 3. A read pulse is then placed on a read signal line READ-; Print data is then read from the start address Y and transferred to the print head 4. During the reading, the start address value Y is stored in the standby register 104. Consequently, the signals LA0 to LA18 represent the value Y.

The selector 105 has selected the signals PBA0 to PBA18. The signals SA0 to SA18 therefore have the same value as the signals PBA0 to PBA18. The selector 106 selects the value YH in the horizontal offset register 102b. However, the masking circuit 107 which is in the masking mode provides a value 0. Being in the noninverting mode, the inverting/noninverting circuit 108 provides the value 0 provided by the masking circuit 107 as is. The carry control circuit 110 sets the carry flag, whereby a value in the adder 109 is incremented by one.

In FIG. 8, a signal by the name of "increment" represents an increment calculated by adding up a value provided by the inverting/noninverting circuit 108 and a value provided by the carry control signal 110. A sum of a value represented by the signals SA0 to SA18 and the increment is supplied for the signals NPA0 to NPA18. Since the increment is +1, the signals NPA0 to NPA18 represent a value Y+1. The value Y+1 is fed back to the address register 101b.

The value Y+1 is then set in the address register 101b synchronously with the next clock pulse. Print data is read from the address Y+1 and transferred to the print head 4. Similarly, a value in the address register 101b is incremented until it becomes Y+2. Print data is then read from an address Y to Y+2 in the print buffer. Thus, yellow print data three bytes long is transferred to the print head.

When the address Y+2 is read, the selector 105 selects the signals LA0 to LA18. The signals SA0 to SA18 therefore have a value stored in the standby register 104. The masking circuit 15 enters the non-masking mode and outputs the value YH residing in the horizontal offset register 102b. The carry control circuit 18 resets the carry flag, whereby the increment is set to YH. The signals NPA0 to NPA18 therefore have a value Y+YH. The value Y+YH is set in the address register 101b synchronously with the last clock pulse.

Figures 7A, 7B, 7C, 7D:
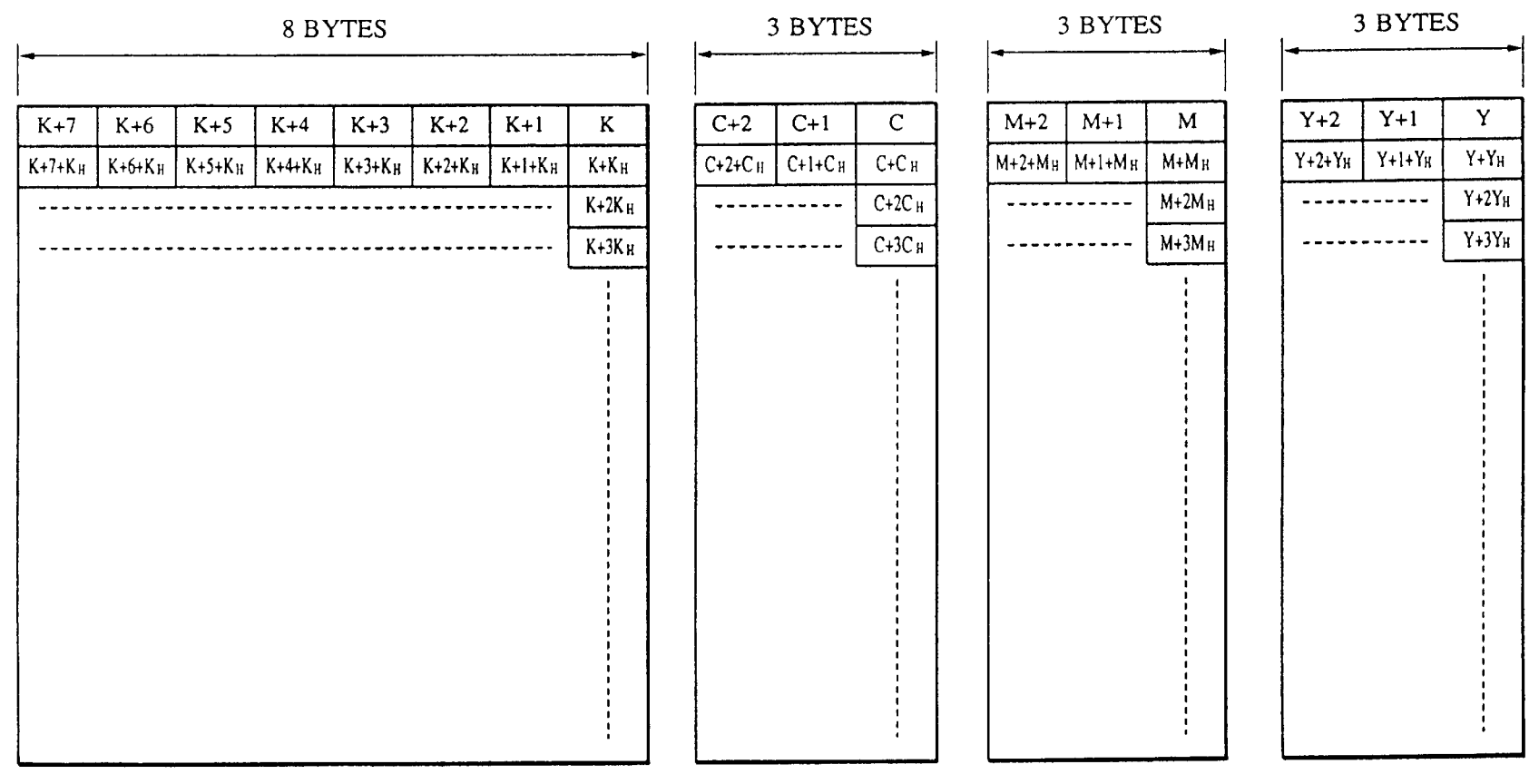

As shown in FIG. 7A, the address Y+YH points to print data residing on the right hand of the address Y in the yellow print buffer. After yellow print data three bytes long has been transferred, a value representing a right-hand address is automatically set in the address register 101b. Similarly, magenta print data, cyan print data, and black print data are read sequentially. For black, however, print data eight bytes long is transferred to the print head.

Every time transfer of color print data is completed, values representing right-hand addresses in the respective color print buffers are re-set in the address registers 101a to 101d. The CPU 1 merely sets values as start addresses before the carriage is scanned but need not re-set other values while the carriage is being scanned. For reverse printing, similarly to that in the first embodiment, the inverting/noninverting circuit 108 is used so that values representing left-hand addresses are set in the address registers 101a to 101d.

Selection performed by the selectors 103, 105, and 106, masking performed by the masking circuit 107, and inversion performed by the inverting/noninverting circuit 108 are, similarly to those in the first embodiment, controlled by a timing control circuit, which is not shown, synchronously with the clock CLK.

As mentioned above, the data transfer circuit of this embodiment manages the yellow print buffer, magenta print buffer, cyan print buffer, and black print buffer separately. For data transfer to the print head, although print data of the respective colors must be combined in specific order and then transmitted, the CPU 1 can reserve color print buffers separately. Thus, the load the CPU 1 must incur for reserving print buffers is reduced.

A horizontal change of addresses in each color print buffer is set in a horizontal offset register. The number of vertically consecutive addresses can therefore be designated arbitrarily. A data structure in a print buffer can be determined irrelevant of the number of dots formed by a print head. An optimal data structure can be adopted for the print buffer according to the processing speed of the CPU 1 and the storage capacity of a memory.

The above description has proceeded on the assumption that a four-color print head is employed. In this embodiment, for example, when the timing control circuit passes control so as to activate a black address register and an associated horizontal offset register alone, the processing similar to that in the first embodiment can be performed. It is therefore understood that a monochrome head can be employed. Print heads permitting different numbers of colors and having different numbers of nozzles can be mounted in a printer in which this embodiment is implemented. Data transfer methods implemented in various print heads can be coped with merely by changing modes set in a data transfer circuit. A data structure in a print buffer can therefore be used in common among different kinds of heads. The load imposed on the CPU 1 can be reduced, and a program for reserving a print buffer can be reduced in size.

Furthermore, if a print head is provided with information for use in recognizing the number of colors or the number of nozzles, a printer analyzes the information and autonomously performs printing according to the type of a print head.

As mentioned above, in the second embodiment, the data transfer circuit controls the addresses in the color print buffers separately. Although color print data must be combined and then transferred to the print head, the CPU cap reserve the color print buffers separately. The load the CPU must incur for reserving print buffers is therefore reduced. Print heads permitting different numbers of colors and having different numbers of dots can be used effortlessly. A data structure in a print buffer can be used in common among different types of heads. The load imposed on the CPU is therefore very small.

(Third Embodiment)

Next, the third embodiment of the present invention will be described. A major portion of circuitry of a printer having a data transfer circuit of this embodiment is identical to the one shown in FIG. 1. The printer comprises the CPU 1, data transfer circuit 2, RAM 3, and print head 4. Dot arrays formed by the print head in this embodiment are identical to the ones shown in FIG. 5. 136 ink-jet nozzles are set in array. The uppermost twenty-four nozzles form yellow dots, the upper twenty-four nozzles form magenta dots, the lower twenty-four nozzles form cyan dots, and the lowermost sixty-four nozzles form black dots.

FIG. 9 is a timing chart describing a driving sequence performed by the print head in this embodiment. In FIG. 9, the print head is driven on a time-sharing basis. 136 nozzles are driven at sixteen shared time instants. Adjoining nozzles are sequentially driven according to different timing (for example, Y16, Y15, etc.). Nozzles responsible for sixteen dots (including a gap comparable to eight dots between nozzle groups) are driven at a time (in other words, nozzles are driven in units of a distance comparable to sixteen dots). Time-sharing driving makes it possible to lower a peak current required for driving a print head and eventually reduce a load imposed on a power supply. Since adjoining nozzles are driven according to different timing, vibration of ink in a print head resulting from jetting of ink droplets can be alleviated. Eventually, an ink jetting characteristic of a print head and a refill time of ink can be improved.

However, as far as a serial printer is concerned, since a print head is driven while being run on recording paper, a time lag in driving leads to a difference in dot position on recording paper. In the driving sequence shown in FIG. 9, a dot array has a saw-tooth outline due to time lags caused by time-sharing driving. For driving a print head on a time-sharing basis, some measures must be taken for fear that displaced printing may occur due to time lags in driving.

A procedure for preventing displaced printing due to time-sharing driving in accordance with this embodiment will be described in conjunction with FIGS. 10A and 10B.

FIG. 10A shows an array of the first (Y1) to twentieth (Y20) yellow nozzles that are the uppermost nozzles in a print head. The print head is mounted in a carriage with it so as to be inclined at 3.58° with respect to a vertical line on recording paper. In other words, the print head has a vertical inclination comparable to sixteen dots and a horizontal inclination comparable to one dot. The carriage is scanned horizontally on recording paper. L in FIGS. 10A and 10B denotes a dot pitch, which is 70.6 micrometers (360 DPI) in this embodiment.

Figure 11A:
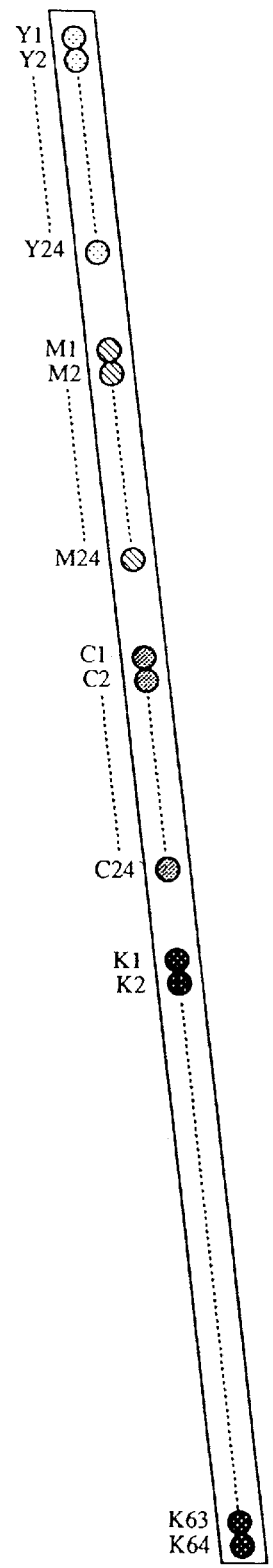
FIGS. 11A and 11B show dot arrays formed by the whole of the print head in the third embodiment.
Figure 11B:
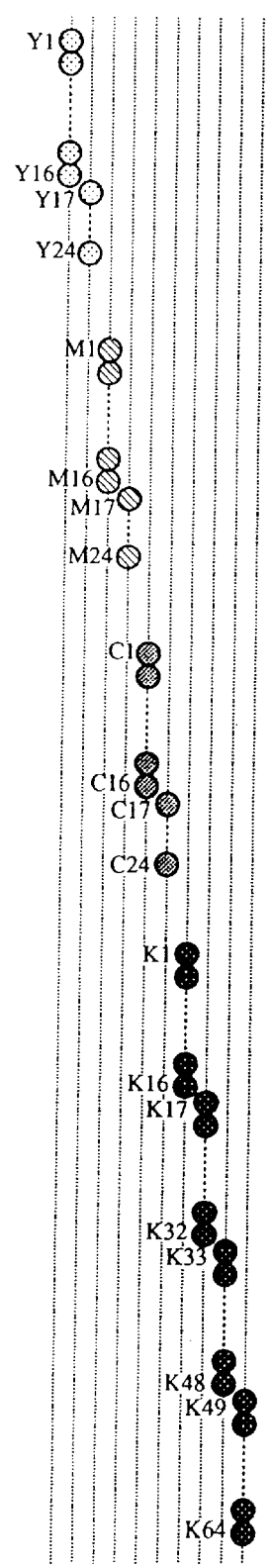

FIG. 10B shows a dot array formed on recording paper according to the driving sequence shown in FIG. 9 under the foregoing circumstances. A time lag in driving due to the time-sharing driving is canceled out by the inclination of the head. Dots formed by the first to sixteenth nozzles are lined up in tandem, causing no displaced printing. Dots formed by the seventeenth nozzle and thereafter are displaced rightward by one dot and are lined up in tandem. These dots therefore belong to a right-hand array. No displaced printing therefore takes place. In terms of the whole print head, as shown in FIGS. 11A to 11B, every seventeenth nozzle shifts to an adjacent array. When the print head is driven once, dot arrays are formed stepwise over ten columns on recording paper (adjoining arrays are spaced by one dot).

To be more specific, in this embodiment, an angle between a direction in which printing elements are arrayed and a direction in which the print (record) head is scanned relative to a recording medium, 0, is set to 3.58°, a dot (pixel) pitch in a direction perpendicular to the direction in which the print head is scanned relative to the recording medium, a, is set to 70.6 micrometers, and a dot pitch in the direction in which the print head is scanned relative to the recording medium, b, is set to 70.6 micrometers. Under these conditions, the relationship below is established.

$$\tan \theta = (P \times b)/(M \times a) = 1/16$$

(where, P=1 and M=16)

Sixteen groups of nozzles are driven at sixteen equally-shared time instants within one drive cycle of the print head.

Figure 12:
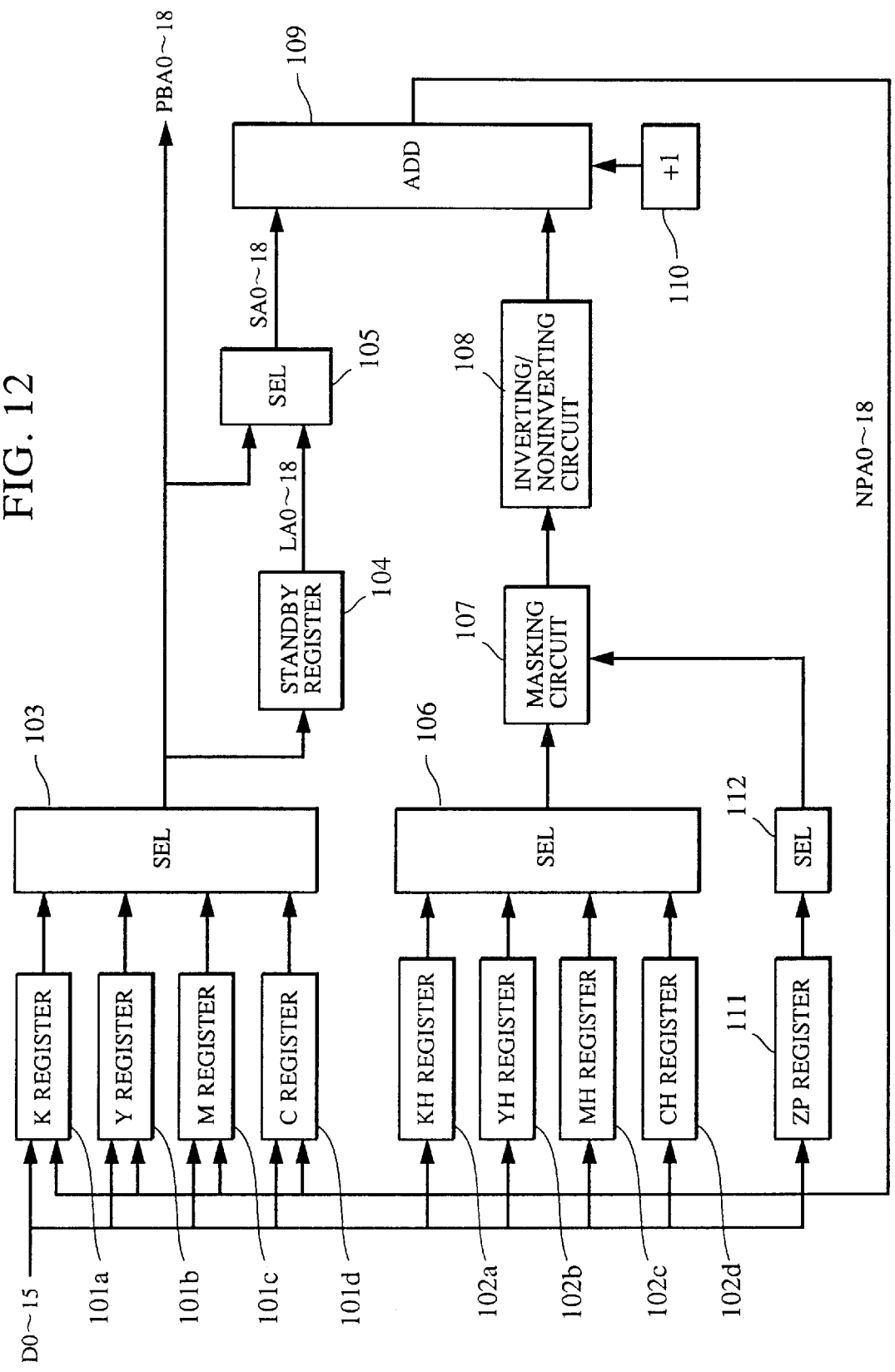
FIG. 12 is a block diagram showing the address creating circuit in the third embodiment.
Figure 13A:
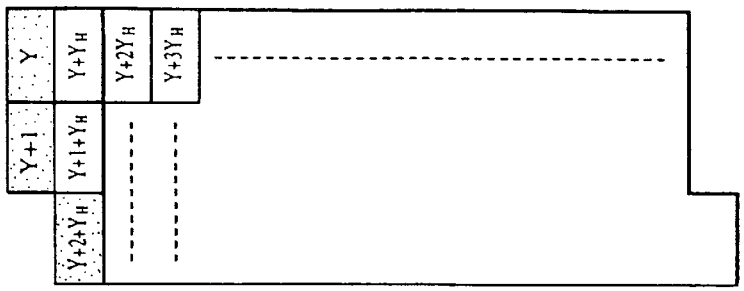
FIGS. 13A to 13D show a data structure in a print buffer in the fourth embodiment.
Figure 13B:
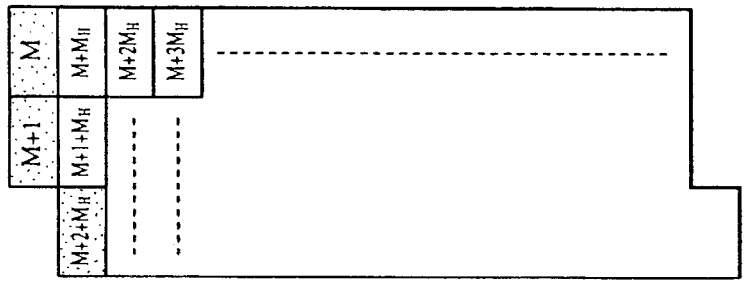
Figure 13C:
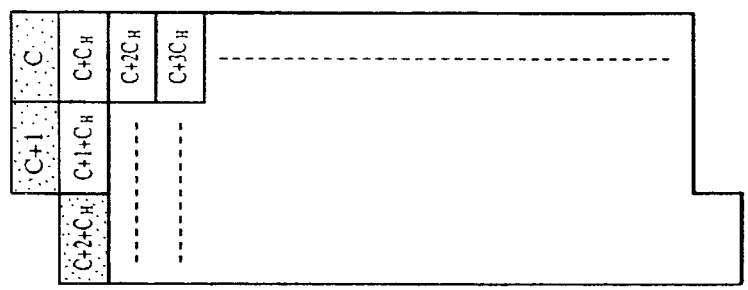
Figure 13D:
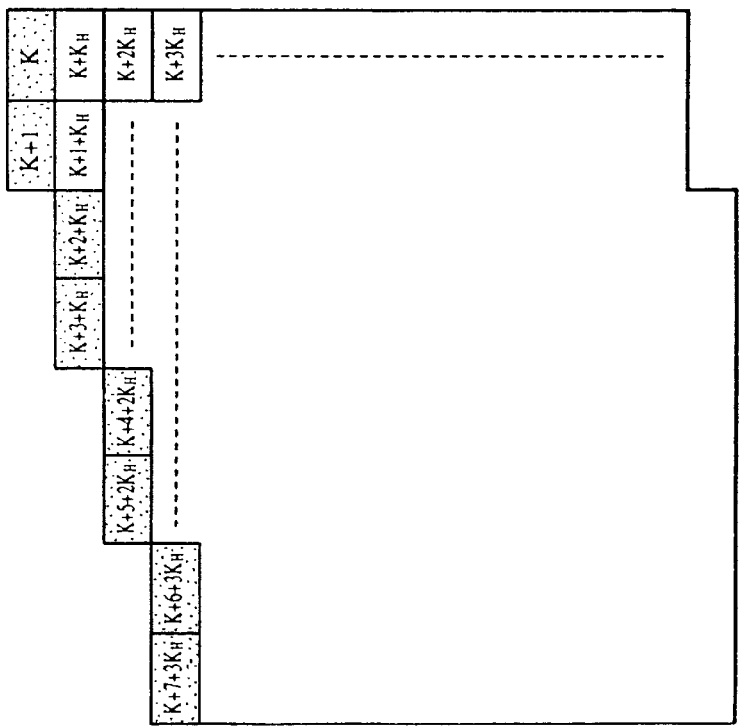

FIG. 12 is a block diagram showing an address creating circuit lying in the data transfer circuit 2 and assisting in reading a print buffer. In FIG. 12, the address (K to C) registers 101a to 101d, horizontal offset (KH to CH) registers 102a to 102d, selector 103, standby register 104, selectors 105 and 106, masking circuit 107, inverting/noninverting circuit 108, adder 109, and carry control circuit 110 have the same functions as those shown in FIG. 6.

Reference numeral 111 denotes a stepwise pattern (ZP) register. 112 denotes a selector. Unlike the second embodiment, this embodiment is characterized by these circuit elements.

The stepwise pattern register 111 is connected to the data signal lines D0 to D15 and stores a stepwise pattern for the print head. The stepwise pattern is data representing an outline of dot arrays formed during one drive cycle of the print head. The selector 112 selects data of a stepwise pattern. A value provided by the selector 112 is fed to the masking circuit 107 and used for controlling masking.

FIGS. 13A to 13D show a data structure in a print buffer. The data structure itself is identical to that shown in FIGS. 7A to 7D. Data to be printed during one drive cycle of the print head corresponds to strippled areas in FIGS. 13A to 13D; that is, addresses Y, Y+1, and Y+2+YH measuring three bytes, addresses M, M+1, and M+2+MH measuring three bytes, addresses C, C+1, and C+2+CH measuring three bytes, and addresses K to K+7+3KH measuring eight bytes. For transferring print data to the print head, as indicated with the strippled areas in FIGS. 13A to 13D, the print buffer is read askew.

Figure 14:
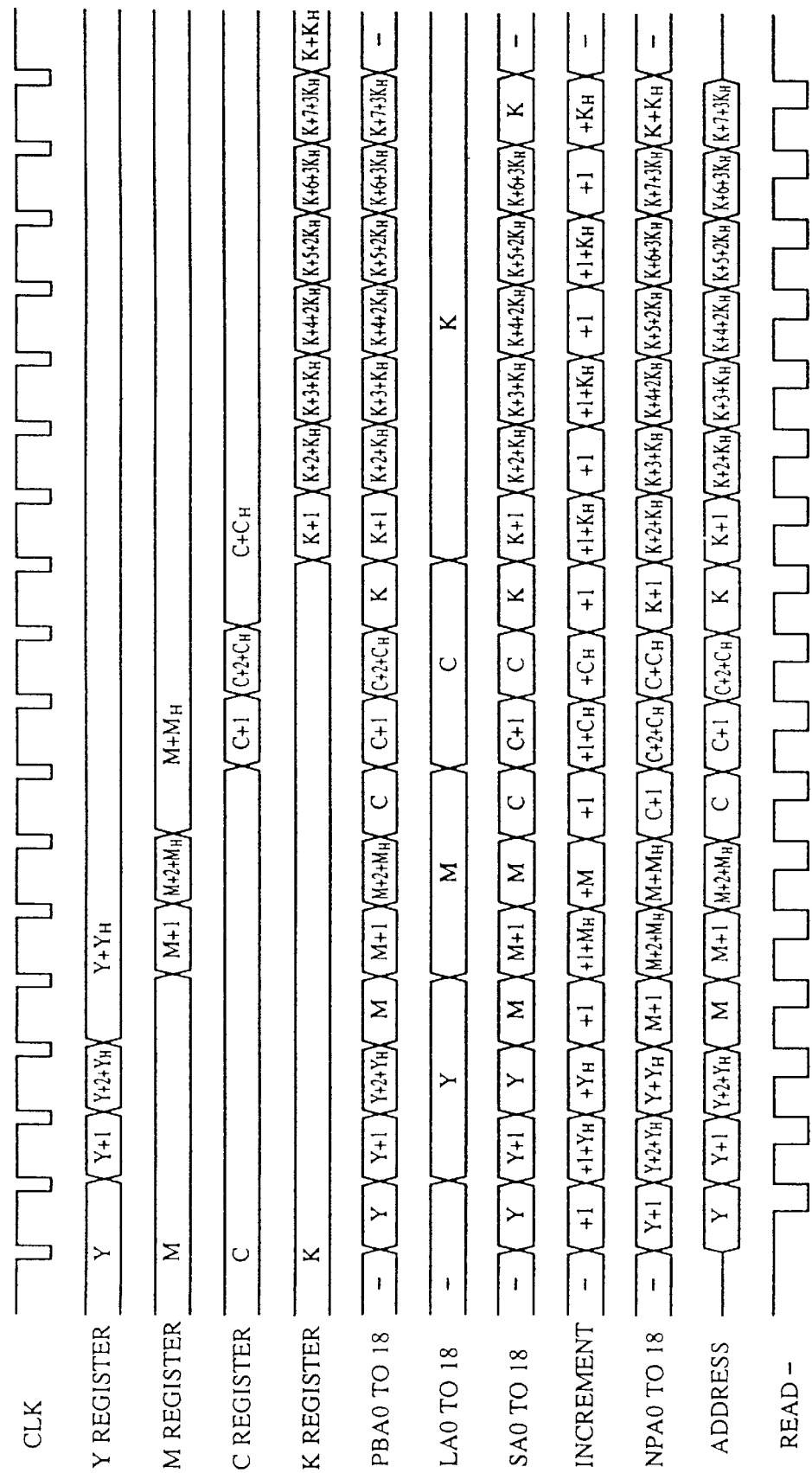
FIG. 14 is a timing chart describing actions taken by an address creating circuit in the fourth embodiment.

FIG. 14 is a timing chart describing actions taken by the address creating circuit shown in FIG. 12. The timing chart is concerned with forward printing. The actions taken by the address creating circuit shown in FIG. 12 will be described specifically in conjunction with FIG. 14.

In FIG. 14, CLK denotes a clock for attaining synchronism in the address creating circuit. Circuit elements in the address creating circuit change states synchronously with a leading edge of the clock CLK. Values K, Y, M, and C are pre-set in the address registers 101a to 101d. Values KH, YH, MH, and CH are pre-set in the horizontal offset registers 102a to 102d. The value in the stepwise pattern register 111 is updated in units of print data for 16 dots or print data two bytes long. When the data transfer circuit 2 starts reading the print buffer, the value Y in the address register 101b is selected by the selector 103 and supplied for the signals PBA0 to PBA18. The value represented by the signals PBA0 to PBA18 is placed on the address signal line ADDRESS leading to the RAM 3. A read pulse is placed on the read signal line READ-. Print data is then read from the start address Y, and transferred to the print head 4. During the reading, the start address value Y is stored in the standby register 104. The signals LA0 to LA18 therefore represent the value Y.

The selector 105 selects the signals PBA0 to PBA18. The signals SA0 to SA18 therefore have the same value as the signals PBA0 to PBA18. The selector 106 selects the value YH in the horizontal offset register 102. Being in the masking mode, the masking circuit 107 outputs a value 0. Being in the noninverting mode, the inverting/noninverting circuit 108 outputs the value 0 provided by the masking circuit 107 as it is. The carry control circuit 110 sets the carry flag, whereby a value in the adder 109 is incremented by one.

In FIG. 14, a signal by the name of "increment" represents an increment calculated by adding up a value provided by the inverting/noninverting circuit 108 and a value provided by the carry control circuit 110. A sum of the value represented by the signals SA0 to SA18 and the increment is supplied for the signals NPA0 to NPA18. Since the increment is +1, the signals NPA0 to NPA18 represent a value Y+1. The value Y+1 is fed back to the address register 101b. The value Y+1 is then set in the address register 101b synchronously with the next clock pulse. Print data is then read from the address Y+1 and transferred to the print head.

At this time, the selector 112 has selected data from a stepwise pattern residing in the stepwise pattern register 111. The masking circuit 107 therefore enters the non-masking mode and outputs the value YH residing in the horizontal offset register 102b. The increment therefore becomes +1+YH. The value in the address register 101b is incremented synchronously with the next clock pulse until it becomes Y+2+YH. Print data three bytes long is read from addresses Y, Y+1, and Y+2+YH in the yellow print buffer and transferred to the print head.

When the address Y+2+YH is read, the selector 105 selects the signals LA0 to LA18. The signals SA0 to SA8 then represent the value Y stored in the standby register 104. The masking circuit 15 enters the non-masking mode and outputs the value YH. The signals NPA0 to NPA18 therefore represents the value Y+YH. This value is set in the address register 101b. Similarly, magenta print data, cyan print data, and black print data are read sequentially. As for black, print data of eight bytes long is transferred to the print head.

Every time transfer of color print data is completed, values representing right-hand addresses in the associated print buffers are re-set in the address registers 101a to 101d.

The CPU 1 therefore merely sets values as start addresses before the cartridge is scanned but need not re-set another values while the cartridge is being scanned. For reverse printing, the inverting/noninverting circuit 108 is used so that values representing left-hand addresses are set in the address registers 101a to 101d.

Selection performed by the selectors 103, 105, 106, and 112, masking performed by the masking circuit 107, and inversion performed by the inverting/noninverting circuit 108 are, similarly to those in the previous embodiments, controlled by a timing control circuit, which is not shown, synchronously with the clock CLK.

As mentioned above, the data transfer circuit in this embodiment has a function of reading the print buffer askew in line with a stepwise outline of dot arrays formed by the print head. The CPU 1 can therefore produce print data for the print buffer without any consciousness of an outline of dot arrays. Consequently, the CPU 1 need incur only a reduced load.

When this embodiment is used in combination with the ink-jet recording technique, it becomes possible to alleviate interference among shock waves in a common liquid chamber.

(Fourth Embodiment)

The fourth embodiment of the present invention will be described. A major portion of circuitry of a printer having a data transfer circuit of this embodiment is identical to the one shown in FIG. 1. The printer comprises the CPU 1, data transfer circuit 2, RAM 3, and print head 4. The arrangement of nozzles in the print head is identical to the one shown in FIG. 5. 136 ink-jet nozzles are set in array. The uppermost twenty-four nozzles form yellow dots, the upper twenty-four nozzles form magenta dots, the lower twenty-four nozzles form cyan dots, and the lowermost sixty-four nozzles form black dots. The driving sequence for the print head is identical to the one shown in FIG. 9. The 136 nozzles are driven at sixteen shared time instants. Dot arrays formed by the print head are identical to those shown in FIGS. 10A, 10B, 11A and 11B. Dot arrays each having sixteen dots lined in tandem are formed over ten columns.

In the printer of this embodiment, print data stored in the print buffer is masked with a specific mask pattern and then printed. The masking is effected so that print image data is thinned out in order to vary printing density on recording paper or so that dots to be printed are changed for each printing pass in order to achieve superposition. Masking is achieved by calculating the AND between print data transferred (read) from the print buffer and mask data.

For storing mask data, part of the RAM is used as a mask buffer. The CPU 1 produces mask data, stores it in the mask buffer, and then executes printing. Mask data produced once is reusable unless it becomes necessary to modify a mask pattern.

A data structure in the mask buffer is identical to the one in the print buffer shown in FIGS. 13A to 13D. Values of start addresses in respective color mask buffers (start addresses from which color mask data is read) are YM for the yellow buffer, MM for the magenta buffer, CM for the cyan buffer, and KM for the black buffer. Values of horizontal offset addresses in the yellow, magenta, and cyan mask buffers are LHM, and a value of a horizontal offset address in the black mask buffer is KHM.

The data transfer circuit in this embodiment reads the print buffer and mask buffer alternately. Print data read from the print buffer is ended with mask data read from the mask buffer. The resultant data is then transferred to the print head. The mask buffer has a capacity of 2 kilobytes. Data 2 kilobytes long is read repeatedly.

Figure 15:
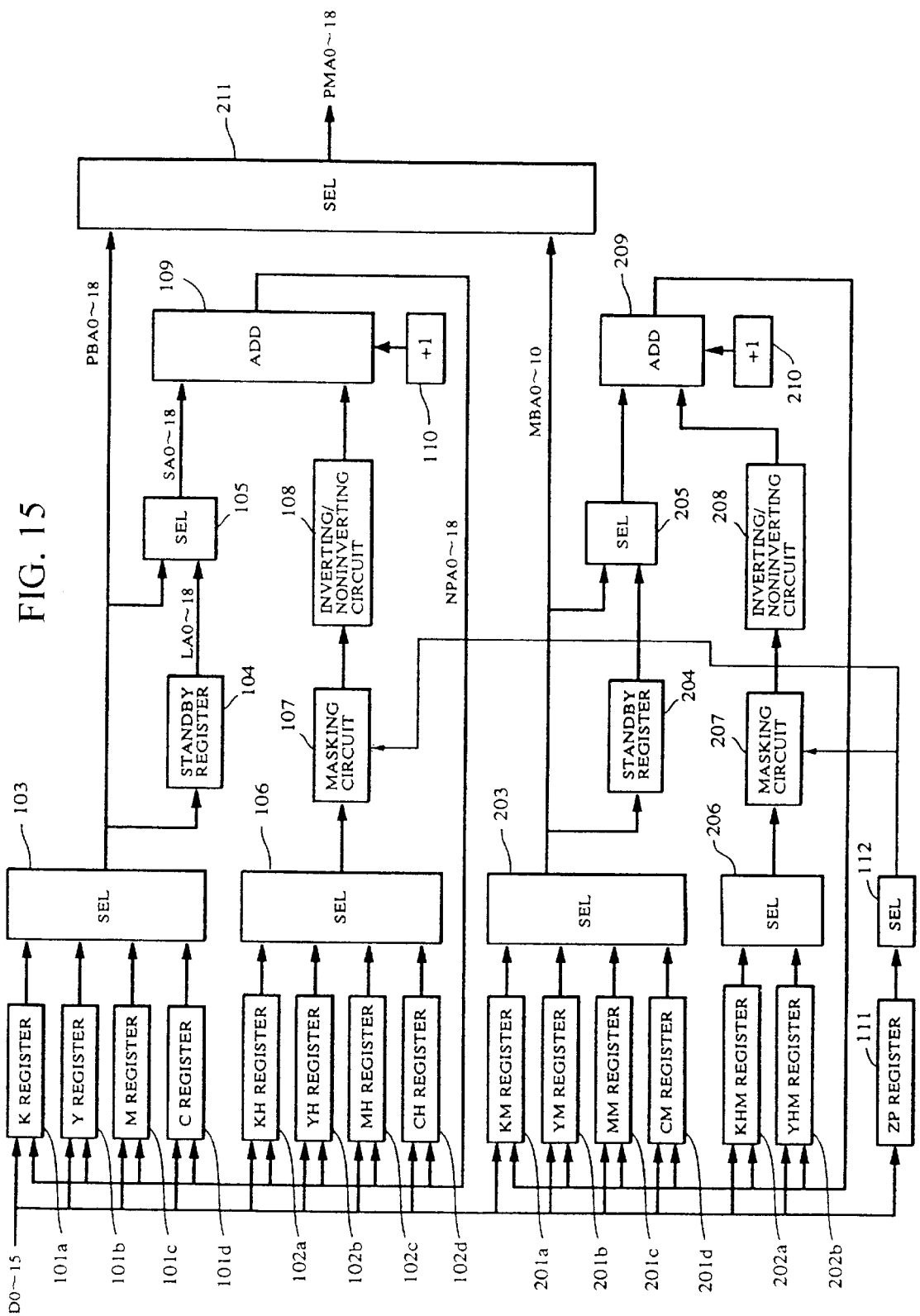
FIG. 15 is a block diagram showing the address creating circuit in the fourth embodiment.

FIG. 15 is a block diagram showing an address creating circuit lying in the data transfer circuit 2 and assisting in reading the print buffer and mask buffer.

In FIG. 15, the address (K to C) registers 101*a* to 101*d*, horizontal offset (KH to KC) registers 102*a* to 102*d*, selector 103, standby register 104, selectors 105 and 106, masking circuit 107, inverting/noninverting circuit 108, adder 109, and carry control circuit 110 constitute a print buffer reserving circuit and have the same functions as those shown in FIG. 12.

The address (KM to CM) registers 201*a* to 201*d*, horizontal offset (KHM and LHM) registers 202*a* and 202*b*, selector 203, standby register 204, selectors 205 and 206, masking circuit 207, inverting/noninverting circuit 208, adder 209, and carry control circuit 210 constitute a mask buffer reserving circuit. Unlike the third embodiment, this embodiment is characterized by these circuit elements. The mask buffer reserving circuit has the same function as the print buffer reserving circuit. However, the mask buffer has a capacity of two kilobytes. A bit length handled in the mask buffer reserving circuit is smaller than the one handled in the print buffer reserving circuit. The yellow, magenta, and cyan horizontal offset registers are united to constitute a color horizontal offset (LHM) register 202*b*.

The stepwise pattern (ZP) register 111 and selector 112 are shared by the print buffer reserving circuit and mask buffer reserving circuit. The stepwise pattern register 111 and selector 112 have the same functions as those shown in FIG. 12. A selector 211 selects either the print buffer address signals PBA0 to PBA18 or the mask buffer address signals MBA0 to MBA10. Since the mask buffer has a capacity of only two kilobytes, the high-order addresses in the mask buffer are set to fixed values.

Figure 16:
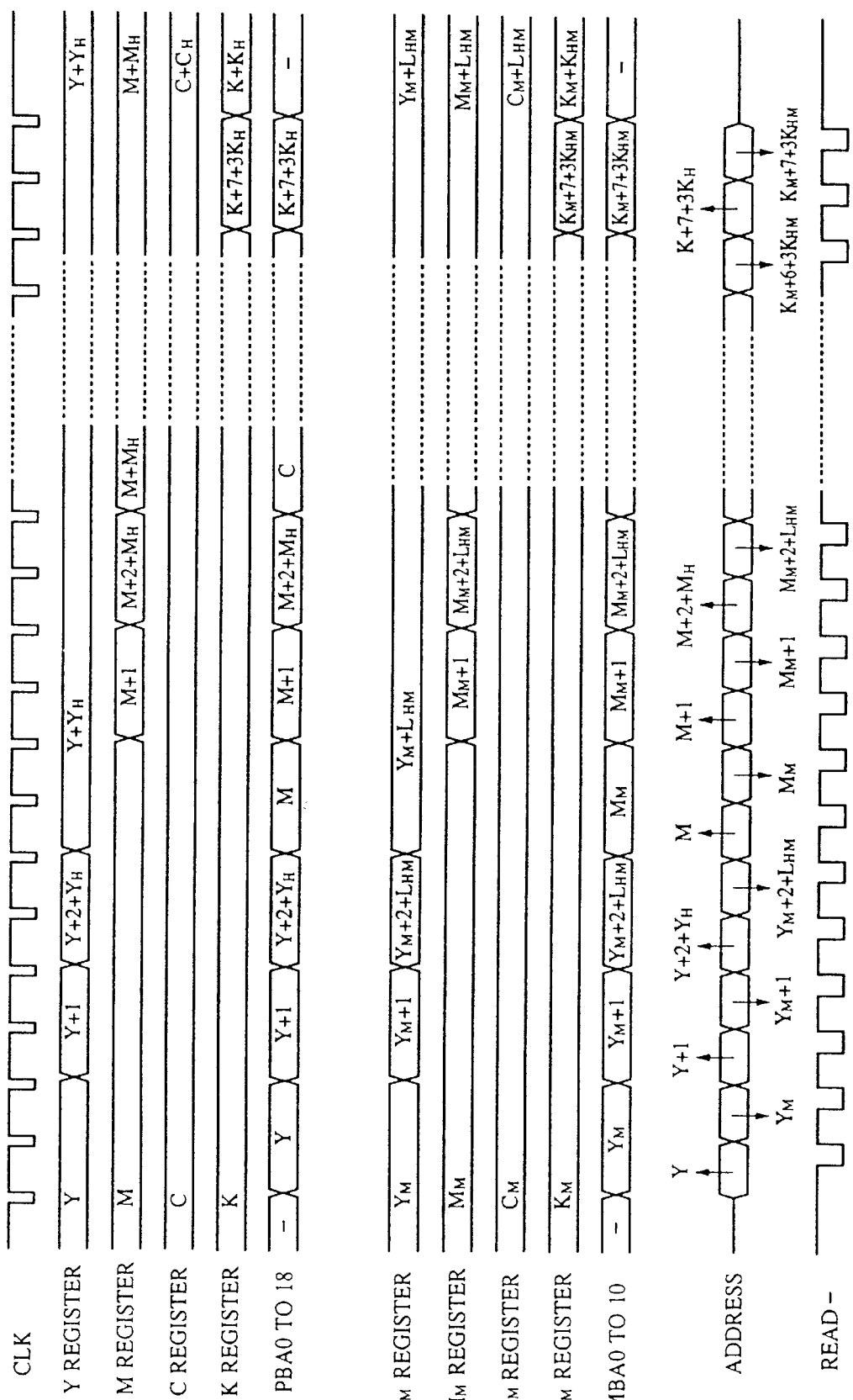
FIG. 16 is a timing chart describing actions taken by the address creating circuit in the fourth embodiment.
Figure 17:
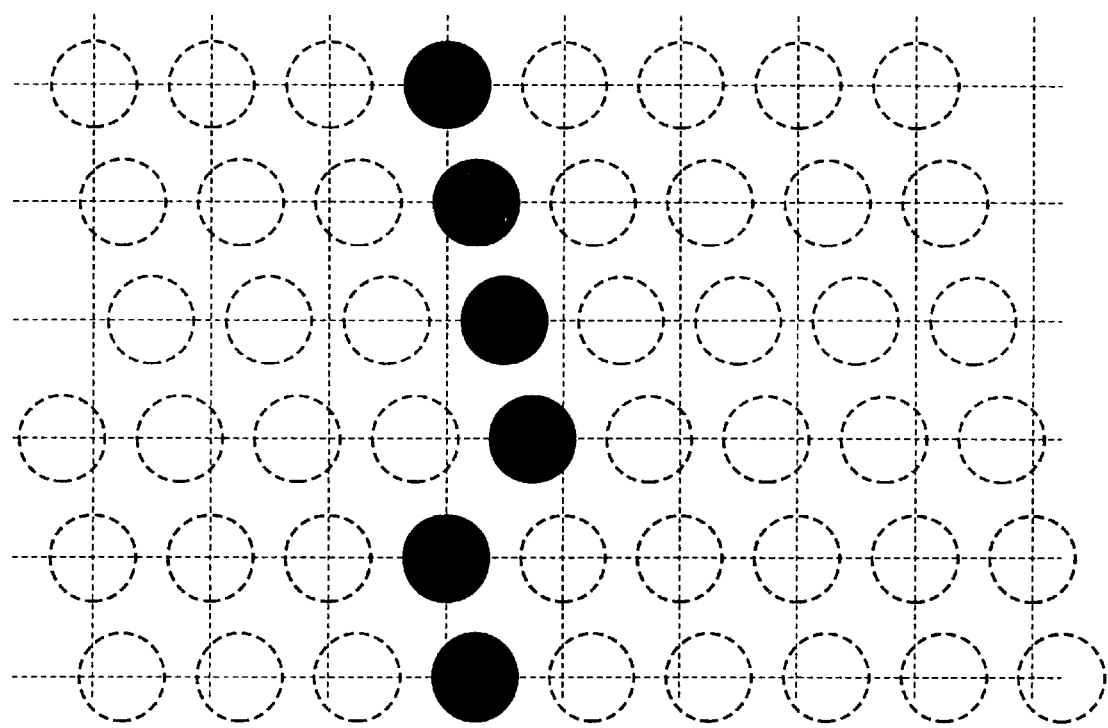
FIG. 17 shows an example of printing based on conventional time-sharing driving.
Figure 18:
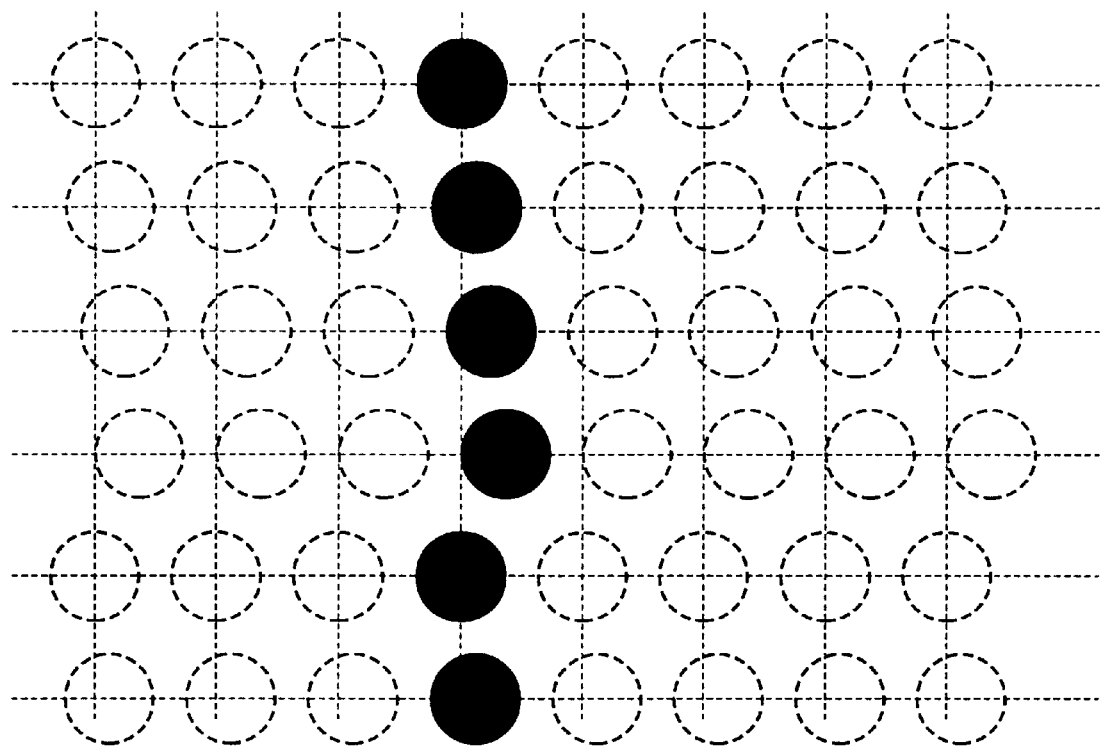
FIG. 18 shows another example of printing based on conventional time-sharing driving.

FIG. 16 is a timing chart describing actions taken by the address creating circuit shown in FIG. 15. The timing chart is concerned with forward printing.

In FIG. 16, "Y register," "M register," "C register," "K register," and "PBA0 to 18" indicates timing of actions taken by the circuit elements of the print buffer reserving circuit. The timing of the actions is identical to the one shown in FIG. 14. However, the circuit elements act once during two pulse durations of the clock CLK. The operation cycle of the print buffer reserving circuit is twice as long as the one shown in FIG. 14. In FIG. 16, "YM register," "MM register," "CM register," "KM register," and "MBA0 to 10" indicate timing of actions taken by circuit elements of the mask buffer reserving circuit. The timing of the actions is identical to the one taken by the print buffer reserving circuit.

The selector 211 alternately outputs the print buffer address signals PBA0 to PBA18 and the mask buffer address signals MBA0 to MBA10 synchronously with a clock pulse. The selector 211 places the address signals PMA0 to PMA18 on the address signal line ADDRESS leading to the RAM. The print buffer and mask buffer are read alternately. Print data read from the print buffer is ANDed (modified) with mask data read subsequently, and then transferred to the print head. The AND operation is effected by an AND circuit (not shown) interposed between the buffer memory and print head.

Selection performed by the selectors 103, 105, 106, 111, 203, 205, and 206, masking performed by the mask circuits 107 and 207, and inversion performed by the inverting/noninverting circuits 108 and 208 are, similarly to those in the previous embodiments, controlled by a timing control circuit, which is not shown, synchronously with the clock CLK.

As mentioned above, the data transfer circuit of this embodiment can mask print data read from the print buffer using a mask pattern read from the mask buffer. The CPU 1 is therefore relieved from masking of print data. Once created, a mask pattern is reusable many times. Creation of a mask pattern does therefore not pose as a big load onto the CPU. The data transfer circuit automatically reads data from the print buffer or mask buffer. While the carriage is being scanned, the CPU 1 need not be involved in reading of the print buffer or mask buffer.

The data transfer circuit can read both the buffers in line with dot arrays formed by a print head. The CPU can therefore reserve the print buffer and mask buffer without any consciousness of the dot arrays formed by the print head.

As mentioned above, the fourth embodiment has the same advantage as the third embodiment. Moreover, since the data transfer circuit has a function of masking print data, the CPU 1 is relieved from masking of print data. A mask pattern is stored in the mask buffer in the RAM. This enables use of a mask pattern containing a large amount of data. Consequently, freedom in creating a mask pattern is markedly upgraded. Furthermore, since the data transfer circuit automatically reads data from the print buffer or mask buffer, the CPU is relieved from reading of both the buffers.

The data transfer circuit has a function of reading both the buffers in line with an outline of dot arrays formed by the print head. The CPU can therefore produce print data and a mask pattern without consciousness of the outline of the dot arrays formed by the print head.

As described so far, according to the first to fourth embodiments of the present invention, a data transfer circuit automatically reads data from a print buffer. A CPU is therefore relieved from reading of the print buffer. Moreover, since a horizontal change of addresses in the print buffer is set in a register, the number of vertically consecutive addresses in the print buffer can be determined arbitrarily. A data structure in the print buffer can therefore be specified irrelevant of the number of dots formed by the print head. Thus, a print buffer can be reserved effortlessly.

(Fifth Embodiment)

Figure 19:
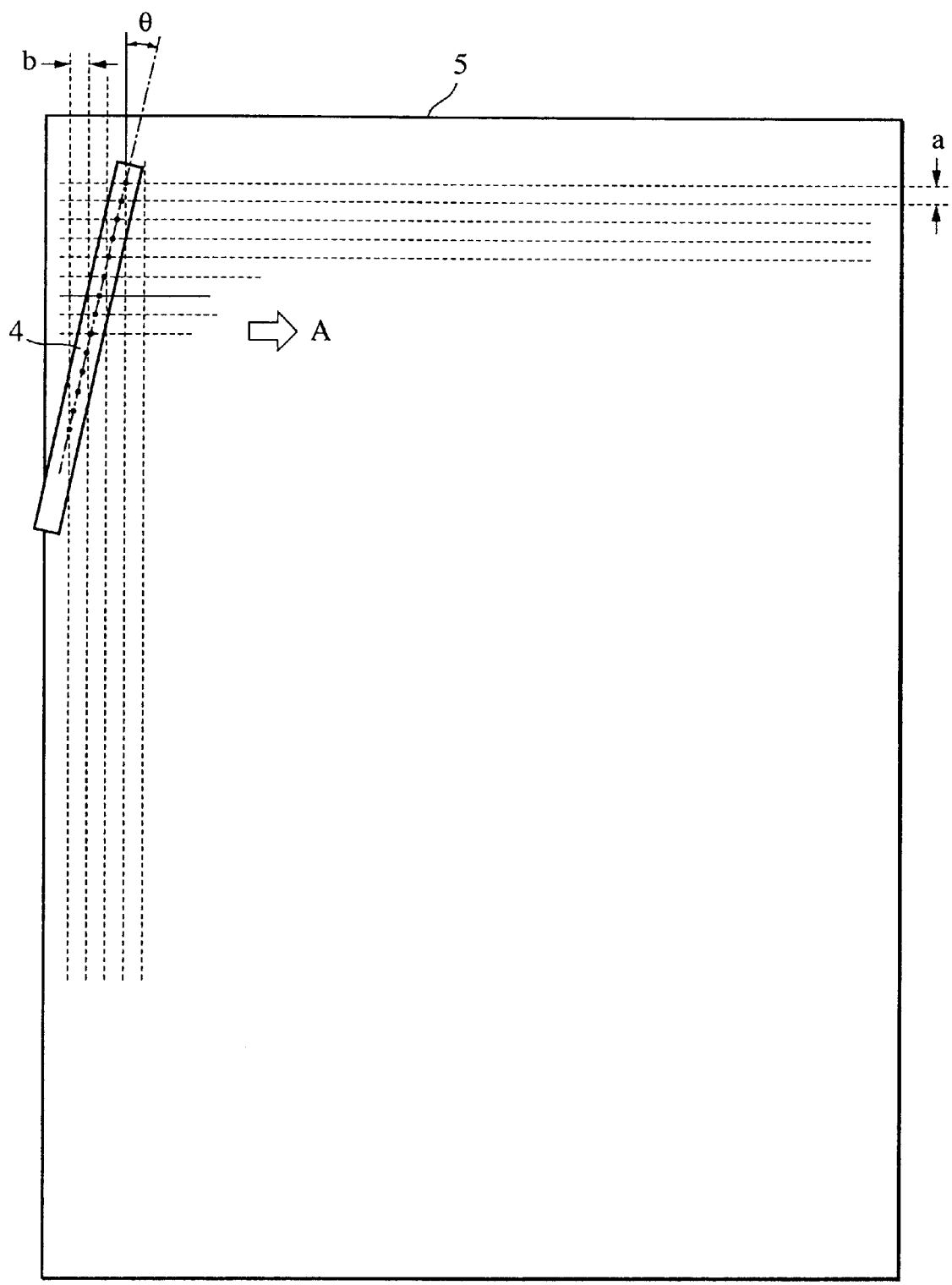
FIG. 19 shows a print head in the fifth embodiment.

FIG. 19 illustrates the fifth embodiment of the present invention. The print head 4 is of the bubble-jet type, has 32 nozzles, and is driven at four shared time instants. In the drive circuit of FIG. 20, reference numeral 41 denotes a 64-bit shift register. 42 denotes a latch register. 43 denotes AND gates assisting in selecting a block. 44 denotes heating elements.

An angle θ of a direction, in which nozzles in the print head 4 are arrayed, with respect to a direction perpendicular to a direction in which the print head 4 scans relative to recording paper 5 has the relationship below.

$$\tan \theta = P/M$$

In this embodiment, M is set to 4 and P is set to 1. That is to say, a lengthwise dot pitch is equal to a sideways dot pitch. The dot pitch is 360 dpi. A nozzle pitch is calculated according to the expression below.

$$360 \times \cos(\tan^{-1}(\tfrac{1}{4}))$$

The nozzle pitch is about 349 dpi.

The print head 4 has a drive frequency of 3 kHz. A carriage, which is not shown, for scanning the print head 4 scans on the recording paper 5 at a speed of 211.7 mm/sec. in the direction of arrow A. Thirty-two nozzles incorporated in the print head 4 are divided into groups which are assigned group numbers as block 1, block 2, block 3, block 4, block 1, block 2, block 3, block 4, etc. from the uppermost group in the print head. The order in which the four groups are driven is determined according to an expression m×P/M+C. Specifically, assuming that C is −0.25, a value given by decimal places of a solution of the expression shall indicate an order of a group. Consequently, block 1, block 2, block 3, and block 4 are driven in that order.

Figure 20:
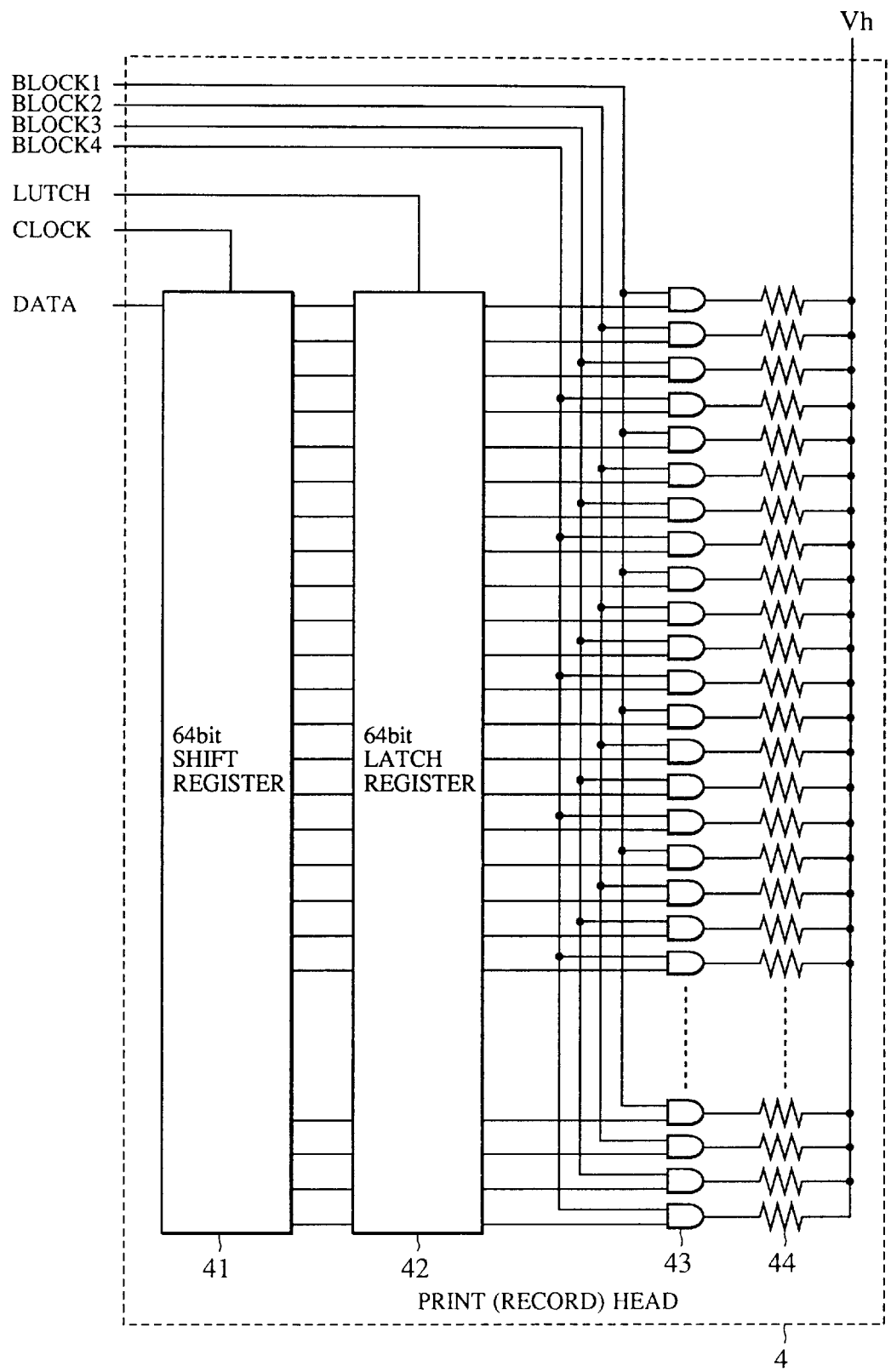
FIG. 20 is a circuit diagram showing a structure of a print head in the fifth embodiment.
Figure 21:
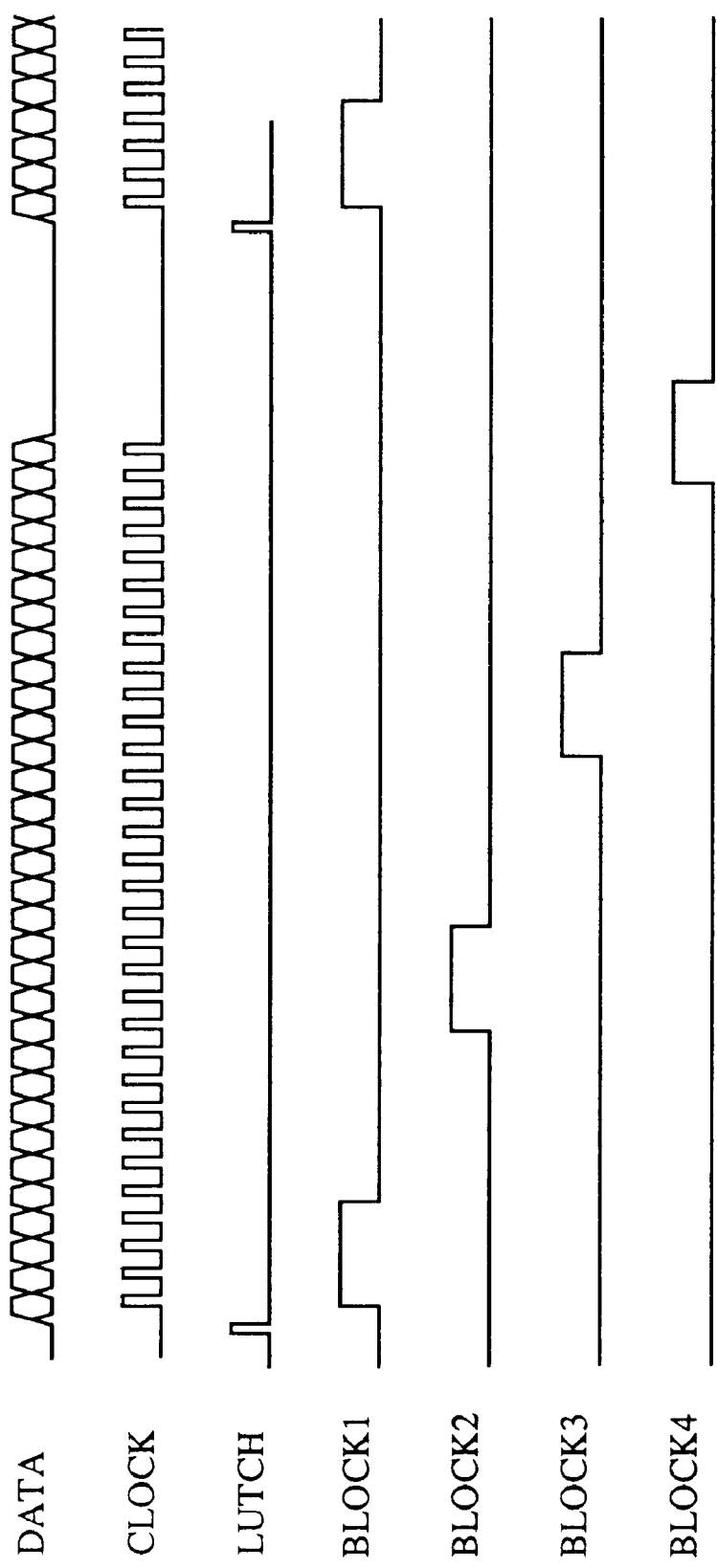
FIG. 21 is a timing chart in the fifth embodiment.
Figure 22:
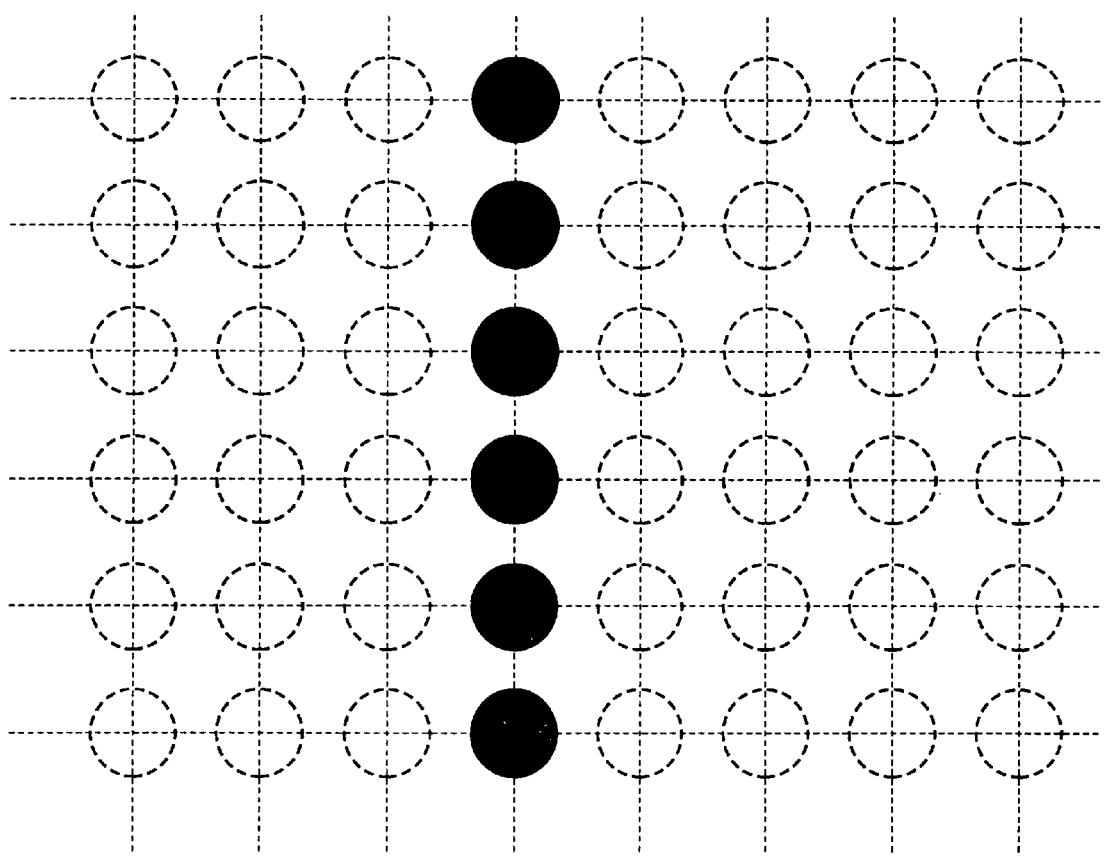
FIG. 22 shows an example of printing in the fifth embodiment.

The drive circuit shown in FIG. 20 drives groups of nozzles at equally-shared time instants as shown in FIG. 21. The drive frequency of the print head 4 is, as described previously, 3 kHz (333 microseconds). A drive cycle of each group is therefore 83.3 microseconds. A dot pitch error in the direction of arrow A between adjoining nozzles is a quarter dot. A carriage advances a distance comparable to a quarter dot during a period of 83.3 microseconds. Ink droplets jetted by the nozzles are, as shown in FIG. 22, shot at correct dot positions.

As for data to be fed to the nozzles belonging to the same group, the data transfer circuit described in conjunction with the first embodiment is used to supply data read from associated addresses.

(Sixth Embodiment)

Figure 23:
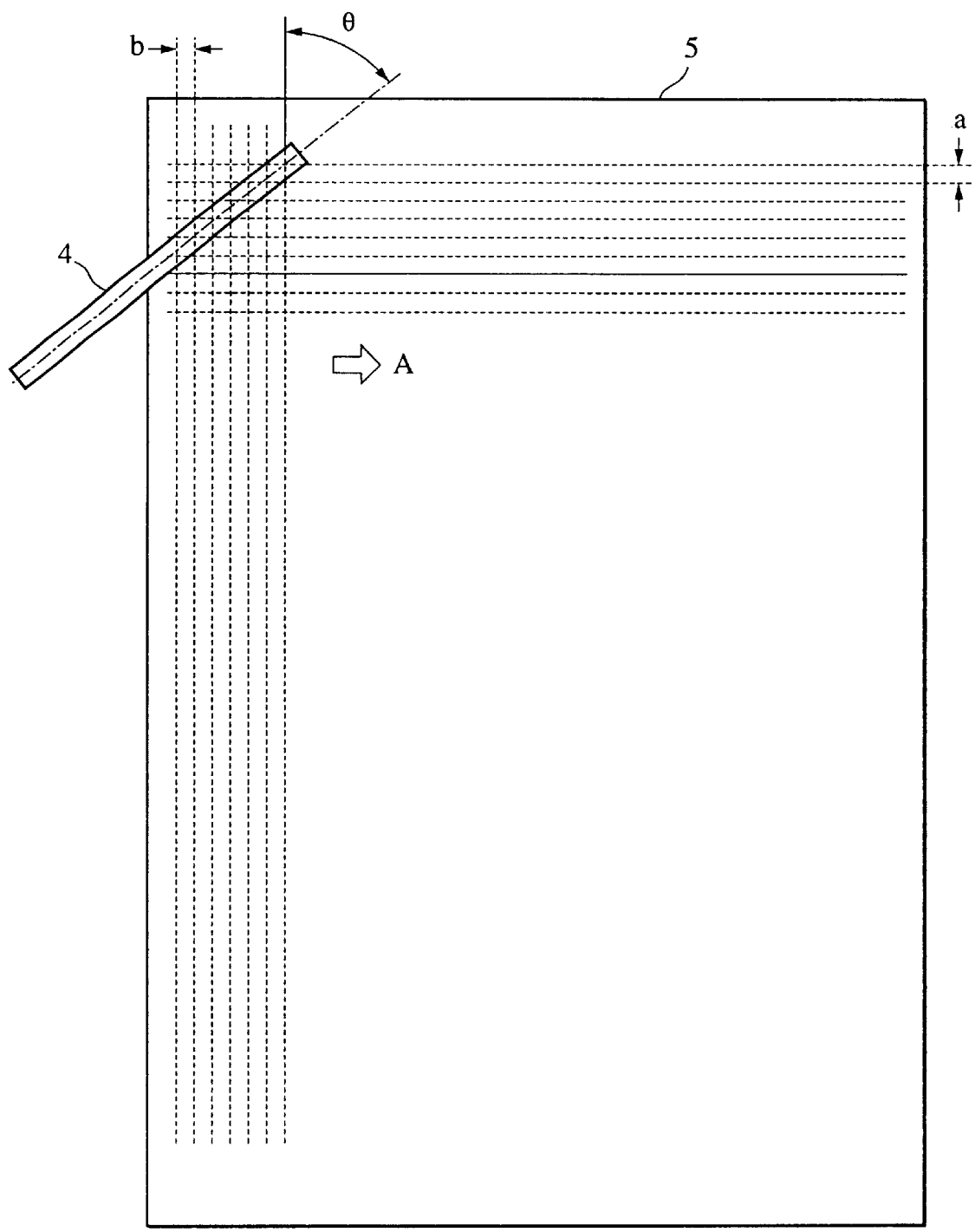
FIG. 23 shows a print head in the sixth embodiment.

FIG. 23 shows the sixth embodiment. In this embodiment, a print head offering a dot pitch of 360 dpi is employed in order to realize a recording apparatus permitting a dot pitch of 600 dpi without causing image disorder. The aforesaid angle θ is determined to have the relationship below.

$$\tan \theta = 4/M$$

Figure 24:
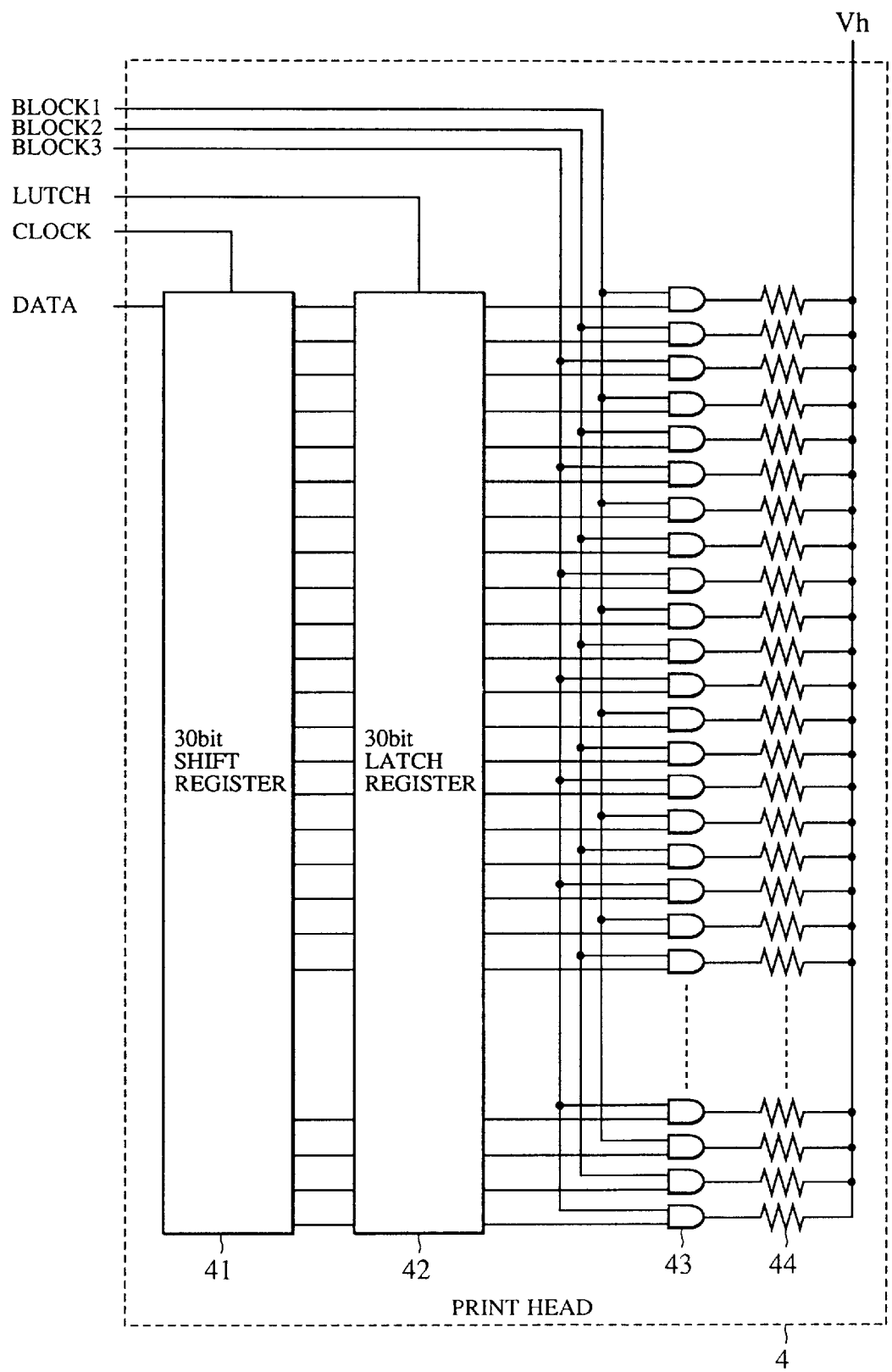
FIG. 24 is a circuit diagram showing a structure of a print head in the sixth embodiment.

M is set to 3. This means that the nozzles are driven at three shared time instants. Circuit elements are shown in FIG. 24. Circuit elements identical to those shown in FIG. 20 are assigned the same reference numerals.

Figure 25:
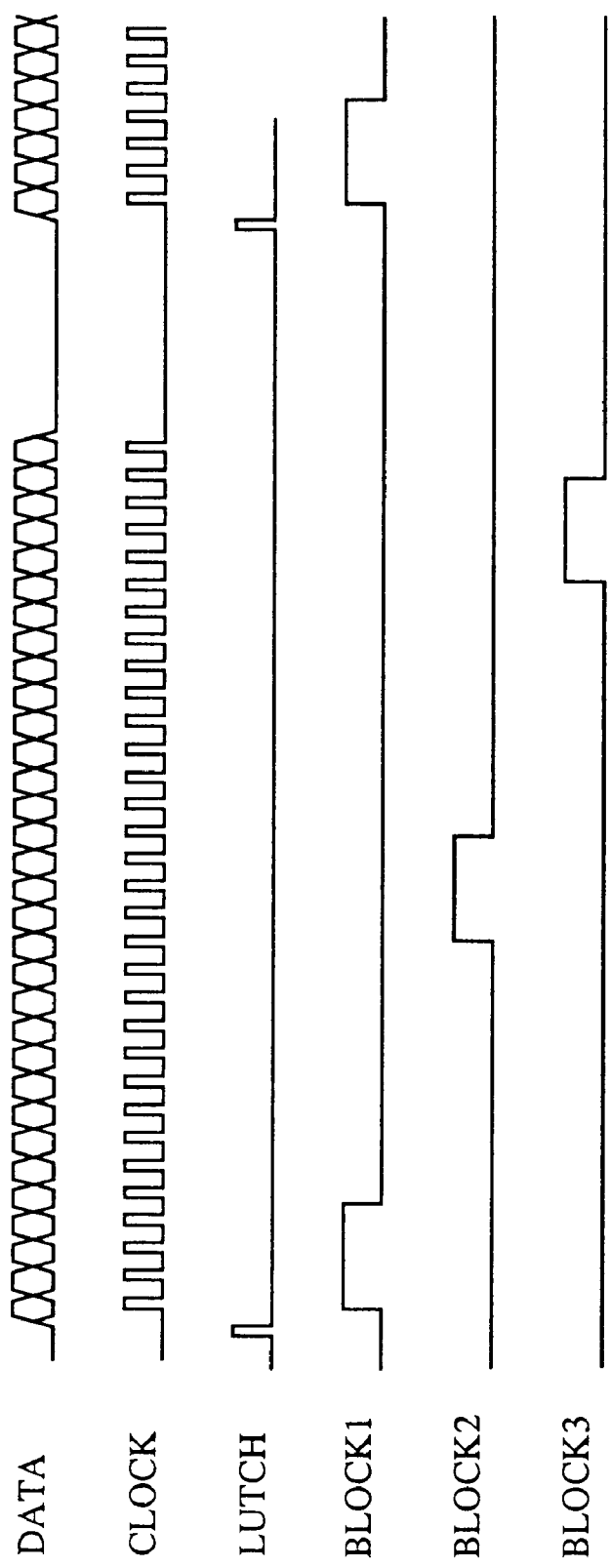
FIG. 25 is a timing chart in the sixth embodiment.

Three groups are driven in ascending order of a value given by decimal places of a solution of m×P/M+C or m×⅓+C. Herein, C denotes a factor determining an initial value of an order of one of groups that are driven cyclically. In this embodiment, C is set to −⅓. The groups of nozzles are assigned group numbers, similarly to those in the second embodiment, as block 1, block 2, block 3, block 1, block 2, block 3, etc. from the uppermost group in the print head. The groups of nozzles are driven in order as block 1, block 2, block 3, block 1, block 2, block 3, etc. FIG. 25 shows drive waves.

According to the fifth or sixth embodiment of the present invention, shared time instants at which groups of nozzles are driven is distributed widely within a drive cycle. This results in a recording apparatus that can further reduce concentration of current on a power supply and alleviate interference among shock waves associated with the ink-jet recording technique, and that even when driving groups of nozzles at shared time instants, causes minimal image disorder.

According to the fifth or sixth embodiment of the present invention, recording can be achieved at any dot pitch that is larger than a nozzle pitch in a print head.

The present invention is particularly suitable for use in an ink jet recording head and recording apparatus wherein thermal energy generated by an electrothermal transducer, a laser beam or the like is used to cause a change of state of the ink to eject or discharge the ink. This is because a high density of the picture elements and a high resolution of the recording are possible.

The typical structure and the operational principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure waves of the thermal energy is formed corresponding to the ejecting portion. This is because the present invention is effective to perform the recording operation with certainty and at high efficiency regardless of the type of recording head.

In addition, the present invention is applicable to a serial type recording head wherein the recording head is fixed on the main assembly, to a replaceable ship type recording head which is connected electrically with the main apparatus and which can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. Examples of such means include a capping means for the recording head, cleaning means therefore, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single head corresponding to a single color ink, or may be plural heads corresponding to the plurality of ink materials having different recording colors or densities. The present invention is effectively applied to an apparatus having at least one of a monochromatic mode mainly with black, a multi-color mode with different color ink materials and/or a full-color mode using a mixture of the colors, which may be an integrally formed recording unit or a combination of plural recording heads.

Furthermore, in the foregoing embodiments, the ink has been liquefied. It also may be ink material which is solid below room temperature but liquid at room temperature. Since the ink is kept at a temperature between 30° C. and 70° C., in order to stabilize the viscosity of the ink to provide the stabilized ejection in the usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of these cases, in response to the application of the recording signal producing thermal energy, the ink is liquefied, and the liquefied ink may be ejected. Another ink material may start to be solidified at the time when it reaches the recording material.

The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one of the techniques described above is the film boiling system.

The ink jet recording apparatus may be used as an output terminal of an information processing apparatus such as a computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A data transfer circuit for transferring data read from a buffer memory to a recording head, comprising:
    an address setting circuit for setting a read start address in one column to be recorded by the recording head for the buffer memory;
    an offset setter arranged to set a predetermined offset for the buffer memory, said offset setter arranged to set a predetermined offset for the buffer memory, the offset indicating a difference between the read start address in the one column and a read address in an adjacent column adjacent to the one column;
    an address creator, arranged to create a predetermined number of consecutive read addresses to be supplied for reading from the buffer memory using the read start address as a read reference address in the one column; and
    an arithmetic logic calculator, arranged to calculate a new read reference address in the adjacent column, after said address creator has created consecutive read addresses using the read start address as a reference address, in accordance with the offset relative to the read start address so as to provide the new read reference address to said address creator for creating further read addresses,
    wherein said offset setter is arranged to set the offset to a larger value than the address corresponding to the number of the recording elements, and said address creator is arranged to create the consecutive read addresses corresponding to the number of the recording elements as the predetermined number.

2. A data transfer circuit for transferring data read from a buffer memory to a recording head, comprising:
    an address setter, arranged to set a plurality of read start addresses for the buffer memory, each of the read start addresses being for a respective one column to be recorded by recording head;
    an address selector, arranged to select the plurality of read start addresses sequentially;
    an offset setter, arranged to set a plurality of predetermined offsets for the buffer memory, each of the offsets indicating a respective difference between a respective one of the read start addresses in the respective one column and a read address in a respective adjacent column adjacent to the respective one column;
    an offset selector arranged to select offsets associated with the read start addresses selected by said address selector;
    an address creator arranged to create a predetermined number of consecutive read addresses to be supplied for reading from the buffer memory using the read start addresses as read reference addresses in the respective one columns; and
    an arithmetic logic calculator, arranged to calculate new read reference addresses in the respective adjacent columns, after said address creator has created consecutive read addresses using the read start addresses as read reference addresses, in accordance with the selected offsets relative to the associated selected read start addresses so as to provide the new read reference addresses to said address creator for creating further read addresses,
    wherein said offset setter is arranged to set the offset to a larger value than the address corresponding to the number of the recording elements, and said address creator is arranged to create the consecutive read addresses corresponding to the number of the recording elements as the predetermined number.

3. A data transfer circuit for transferring data read from a buffer memory, comprising:
    an address setter, arranged to set a read start address in one column to be recorded by the recording head for the buffer memory;
    an offset setter, arranged to set a predetermined offset for the buffer memory, the offset indicating a difference between the read start address in the one column and a read address in an adjacent column adjacent to the one column;
    an address creator, arranged to create a read address to be supplied for reading from the buffer memory using the read start address as a read reference address in the one column, said address creator including means for incrementing the read address and means for adding the offset to the read address to be incremented; and
    an arithmetic logic calculator, arranged to calculate a new read reference address in the adjacent column after said address creator has created the read address using the read start address as a read reference address, in accordance with the offset relative to the read start address, so as to provide the new read reference address to said address creator,
    wherein said offset setter is arranged to set the offset to a larger value than the address corresponding to the number of the recording elements, and said address creator is arranged to create the consecutive read addresses corresponding to the number of the recording elements as the predetermined number.

4. A data transfer circuit for transferring data read from buffer memories to a recording head, comprising:
- first and second address creators, each including an address setter arranged to set a read start address in one column to be recorded by the recording head for a respective buffer memory, an offset setter, arranged to set a predetermined offset for the buffer memory, the offset indicating a difference between the read start address in the one column and a start address in an adjacent column adjacent to the one column, an address creator, arranged to create a predetermined number of consecutive read addresses to be supplied for reading from the buffer memory using the start address as a read reference address in the one column, and an address calculator, arranged to calculate a new read reference address in the adjacent column, after the address creator has created consecutive read addresses using the read start address as a read reference address, in accordance with the offset relative to the read start address, so as to provide the new read reference address to the address creator; and
- a read address selector, arranged to select a first read address created by said first address creator or a second read address created by said second address creator,
- wherein said offset setter is arranged to set the offset to a larger value than the address corresponding to the number of the recording elements, and said address creator is arranged to create the consecutive read addresses corresponding to the number of the recording elements as the predetermined number.

5. A recording apparatus for a recording medium using a print head, comprising:
- a buffer memory for storing print data;
- an address setter, arranged to set a read start address in one column to be printed by the print head for said buffer memory;
- an offset setter, arranged to set a predetermined offset for said buffer memory, the offset indicating a difference between the start address in the one column and a start address in an adjacent column adjacent to the one column;
- an address creator, arranged to create a predetermined number of consecutive read addresses to be supplied for reading from said buffer memory using the read start address as a read reference address in the one column; and
- an arithmetic logic calculator arranged, using the read start address as a read reference address, to calculate a new read reference address in the adjacent column in accordance with the offset relative to the read start address, so as to provide the new read reference address to said address creator for creating further read addresses,
- wherein said offset setter is arranged to set the offset to a larger value than the address corresponding to the number of the recording elements, and said address creator is arranged to create the consecutive read addresses corresponding to the number of the recording elements as the predetermined number.

6. A recording apparatus for recording on a recording medium using a plurality of print heads, comprising:
- a buffer memory for storing print data;
- an address setter, arranged to set a plurality of read start addresses for said buffer memory, each of read start addresses being for a respective one column to be recorded by a respective one of the print heads;
- an address selector, arranged to select the plurality of read start addresses sequentially;
- an offset setter, arranged to set a plurality of predetermined offsets for said buffer memory, each of the offsets indicating a difference between a respective one of the read start addresses and a read address in an adjacent column adjacent to the respective one column;
- an offset selector, arranged to select offsets associated with the selected read start addresses selected by said address selector;
- an address creator, arranged to create a predetermined number of consecutive read addresses to be supplied for reading from said buffer memory using the read start addresses as read reference addresses in the respective one columns; and
- arithmetic logic for, after said address creator has created consecutive read addresses using the read start addresses as read reference addresses, calculating new read reference addresses in the respective one columns in accordance with the selected offsets relative to the associated selected read start addresses so as to provide the new read reference addresses for said address creator,
- wherein said offset setter is arranged to set the offset to a larger value than the address corresponding to the number of the recording elements, and said address creator is arranged to create the consecutive read addresses corresponding to the number of the recording elements as the predetermined number.

7. A recording apparatus for recording a recording medium using a print head, comprising:
- a buffer memory for storing print data;
- an address setter, arranged to set a read start address in one column to be printed by the print head for said buffer memory;
- an offset setter, arranged to set a predetermined offset for said buffer memory, the offset indicating a difference between the read start address and a read address in an adjacent column adjacent to the one column;
- an address creator, arranged to create a read address to be supplied for reading from said buffer memory using the read start address as a reference address in the one column, said address creator including an incrementor, arranged to increment the read address, and an adder, arranged to add the offset to the read address to be incremented; and
- an arithmetic logic calculator, arranged to calculate a new read reference address in the adjacent column after said address creator has created the read address using the read start address as a read reference address, in accordance with the offset relative to the read start address so as to provide the new read reference address to said address creator,
- wherein said offset setter is arranged to set the offset to a larger value than the address corresponding to the number of the recording elements, and said address creator is arranged to create the consecutive read addresses corresponding to the number of the recording elements as the predetermined number.

8. A recording apparatus for recording on a recording medium using a print head, comprising:
- buffer memories for storing print data;
- first and second address creators each including an address setter, arranged to set a read start address in one column to be printed by the print head for a respective buffer memory, an offset setter, arranged to set a predetermined offset for said buffer memory, the offset indicating a difference between the read start address and a respective read address in an adjacent column adjacent to the one column, an address creator, arranged to create a predetermined number of consecutive read addresses to be supplied for reading from said buffer memory using the read start address as a read reference address in the one column, and an address calculator, arranged to, after the address creator has created the consecutive read addresses, using the read start address as a read reference address, calculate a new read reference address in the adjacent column in accordance with the offset relative to the read start address so as to provide the new read reference address to said address creator; and an address selector, arranged to select a first read address created by said first address creator or a second read address created by said second address creator, wherein said offset setter is arranged to set the offset to a larger value than the address corresponding to the number of the recording elements, and said address creator is arranged to create the consecutive read addresses corresponding to the number of the recording elements as the predetermined number.

* * * * *

UNITED STATES PATENT AND TRADEMARK OFFICE
CERTIFICATE OF CORRECTION

PATENT NO. : 6,564,310 B2
DATED : May 13, 2003
INVENTOR(S) : Kazuhiro Nakata et al.

It is certified that error appears in the above-identified patent and that said Letters Patent is hereby corrected as shown below:

Column 10,
Line 24, "dour" should read -- four --; and
Line 66, "circuit 107," should read -- circuit 107. --.

Column 11,
Line 52, "READ-;" should read -- READ-. --.

Column 13,
Line 21, "cap" should read -- can --.

Column 14,
Line 28, "0," should read -- $\theta$, --; and
Lines 60 and 66, "strippled" should read -- stippled --.

Column 16,
Line 3, "values" should read -- value --; and
Line 65, "ended" should read -- ANDed --.

Column 18,
Line 49, "angle 0" should read -- angle $\theta$ --.

Signed and Sealed this

Second Day of December, 2003

JAMES E. ROGAN
*Director of the United States Patent and Trademark Office*